(12) United States Patent
Corrigan

(10) Patent No.: US 9,585,412 B2
(45) Date of Patent: Mar. 7, 2017

(54) PROCESS FOR MAKING A PET FOOD IN THE FORM OF A COATED KIBBLE

(71) Applicant: MARS, INCORPORATED, McLean, VA (US)

(72) Inventor: Patrick Joseph Corrigan, Glendale, OH (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 14/939,268

(22) Filed: Nov. 12, 2015

(65) Prior Publication Data

US 2016/0058033 A1    Mar. 3, 2016

Related U.S. Application Data

(63) Continuation of application No. 13/009,872, filed on Jan. 20, 2011, now abandoned.

(60) Provisional application No. 61/297,391, filed on Jan. 22, 2010.

(51) Int. Cl.
  *A23K 1/00* (2006.01)

(52) U.S. Cl.
  CPC .............. *A23K 1/004* (2013.01); *A23K 40/30* (2016.05); *A23K 50/42* (2016.05)

(58) Field of Classification Search
  CPC . A23K 1/00; A23K 1/004; A23K 1/18; A23K 1/1846; A23K 1/1853; A23K 1/186; A23K 1/1866; A23K 40/30; A23K 50/40; A23K 50/42; A23K 50/45; A23K 50/48; A23L 1/00; A23L 1/0029; A23L 1/0032; A23L 1/0047; A23L 1/005; A23L 1/0052; A23L 3/50; A23P 1/00; A23P 1/045; A23P 1/08

USPC .......................................... 426/302, 303, 805
See application file for complete search history.

(56) References Cited

U.S. PATENT DOCUMENTS

| | | |
|---|---|---|
| 3,600,187 A | 8/1971 | Elebogen |
| 4,026,967 A | 5/1977 | Flexman et al. |
| 4,791,735 A | 12/1988 | Forberg |
| 5,024,320 A | 6/1991 | Musschoot |
| 5,067,431 A | 11/1991 | Heitmiller |
| 5,592,748 A | 1/1997 | Mitzkat et al. |
| 5,816,386 A | 10/1998 | Carlyle |
| 5,855,857 A | 1/1999 | Dithmer |
| 5,948,431 A | 9/1999 | Lavery |

(Continued)

FOREIGN PATENT DOCUMENTS

WO    2009138577    11/2009

OTHER PUBLICATIONS

Rodenburg, Horizontal twin-shaft paddle mixers—the ultimate in mixing technology; International Aquafeed, Jan./Feb. 2009; p. 32-34.*

(Continued)

*Primary Examiner* — Walter Moore
(74) *Attorney, Agent, or Firm* — Mars, Incorporated; Colleen Kramer

(57) ABSTRACT

A process of making a pet food include providing a core pellet; providing at least one coating material; applying the coating material to the core pellet to form a coated kibble using a continuous fluidizing mixer; wherein application of the coating material occurs at a Froude number range of from about 0.8 to about 3 and a Peclet number greater than about 6.

13 Claims, 5 Drawing Sheets

(56) References Cited

U.S. PATENT DOCUMENTS

| | | | |
|---|---|---|---|
| 6,035,543 A | 3/2000 | Carlyle | |
| 6,230,875 B1 | 5/2001 | Carlyle | |
| 6,387,393 B1 | 5/2002 | Lavery | |
| 6,457,255 B1 | 10/2002 | Carlyle | |
| 6,517,232 B1 | 2/2003 | Blue | |
| 6,846,465 B2 | 1/2005 | Commereuc et al. | |
| 6,948,611 B2 | 9/2005 | Dumbaugh | |
| 7,037,048 B2 | 5/2006 | Markowski et al. | |
| 7,322,569 B2 | 1/2008 | Kraus | |
| 7,377,728 B2 | 5/2008 | Markowski et al. | |
| 7,540,694 B2 | 6/2009 | Markowski et al. | |
| 7,910,127 B2 | 3/2011 | Connolly et al. | |
| 7,951,493 B2 | 5/2011 | Lin et al. | |
| 8,146,538 B2 | 4/2012 | Kling et al. | |
| 8,323,711 B2 | 12/2012 | Brandt, Jr. et al. | |
| 8,839,713 B2 | 9/2014 | Foerster | |
| 2005/0153018 A1 | 7/2005 | Ubbink et al. | |
| 2005/0249837 A1 | 11/2005 | Massimino et al. | |
| 2008/0145411 A1 | 6/2008 | Shinagawa et al. | |
| 2009/0092752 A1* | 4/2009 | Brandt, Jr. | A23G 3/0095 427/212 |
| 2009/0220646 A1 | 9/2009 | Street et al. | |
| 2010/0233320 A1 | 9/2010 | Sunvold et al. | |
| 2010/0233756 A1 | 9/2010 | Sunvold et al. | |
| 2010/0303968 A1 | 12/2010 | Sunvold et al. | |

OTHER PUBLICATIONS

Bright Hub Engineering, Twin Shaft Paddle Mixer, Available at: http://www.brighthubengineering.com/manufacturing-technology/57380-twin-shaft-paddle-mixer/; accessed on Sep. 9, 2013; published on Nov. 26, 2009.*

* cited by examiner

US 9,585,412 B2

PROCESS FOR MAKING A PET FOOD IN THE FORM OF A COATED KIBBLE

CROSS REFERENCE TO RELATED APPLICATIONS

This application is a continuation of Ser. No. 13/009,872, filed on Jan. 20, 2011 (Pending), which, in turn, claims the benefit of and priority to U.S. Provisional Application No. 61/297,391, which was filed on Jan. 22, 2010.

FIELD

The present invention relates to the field of processes for making a pet food. The present invention more particularly, but not exclusively, relates to coating a core with a coating material.

BACKGROUND

Pet food manufacturers continually try to improve dry pet foods to make them more nutritious and taste better. Dry pet foods are typically extruded using heat and pressure to make nutritionally balanced, low moisture pellets (kibbles) that are shelf-stable. Unfortunately, these dry kibbles can often be bland-tasting to the animal, so manufacturers usually coat the kibbles with a fat or a palatant to improve the flavor. However, it has now been found that if some of the ingredients normally added to the extruder are instead saved for after extrusion and coated on the outside, the kibble can have improved flavor without adding as much extra fat or palatants. This coating on the outside after extrusion not only saves costs but also results in less nutrition degradation since these ingredients do not go through the extruder and thus do not experience the heat and pressure thereof. Thus, the product is less expensive, better tasting, and higher in nutrition. For example vitamins, Probiotics, or other temperature sensitive nutritional ingredients can be added to the surface of the kibble post-extrusion resulting in a higher level of active material on the kibble due to the less thermal degradation. It has also been found that when nutrients such as amino acids and animal proteins are added to the outside of the kibble, the kibbles taste better to the animals, and nutrients are often more digestible. Accordingly, aspects of these benefits of post-extrusion processing are disclosed herein.

SUMMARY

In one embodiment, a process of making a pet food is disclosed. The process can include providing a core pellet; providing at least one coating material; applying the coating material to the core pellet to form a coated kibble using a continuous fluidizing mixer; wherein application of the coating material occurs at a Froude number range of from about 0.8 to about 3 and a Peclet number greater than about 6. In one embodiment, the process can result in an average residence time of the core pellet within the continuous fluidizing mixer to be from about 10 seconds to about 600 seconds. In one embodiment, the continuous fluidizing mixer can utilize paddles in a rotation that is counter-rotating. In one embodiment, the counter-rotating paddles can cause the core material to have an upwardly convective flow near the center of the continuous fluidizing mixer. In one embodiment, the continuous fluidizing mixer can be operated such that the core materials have a flow through the continuous fluidizing mixer of from about 10 kg/hr to about 60,000 kg/hr. In some embodiments, the coating material can include a Probiotic, mannoheptulose, and/or an emulsifier having a plurality of hydroxyl groups, such as polysorbate ester or polysorbate 80.

DETAILED DESCRIPTION

Definitions

Figure 1:
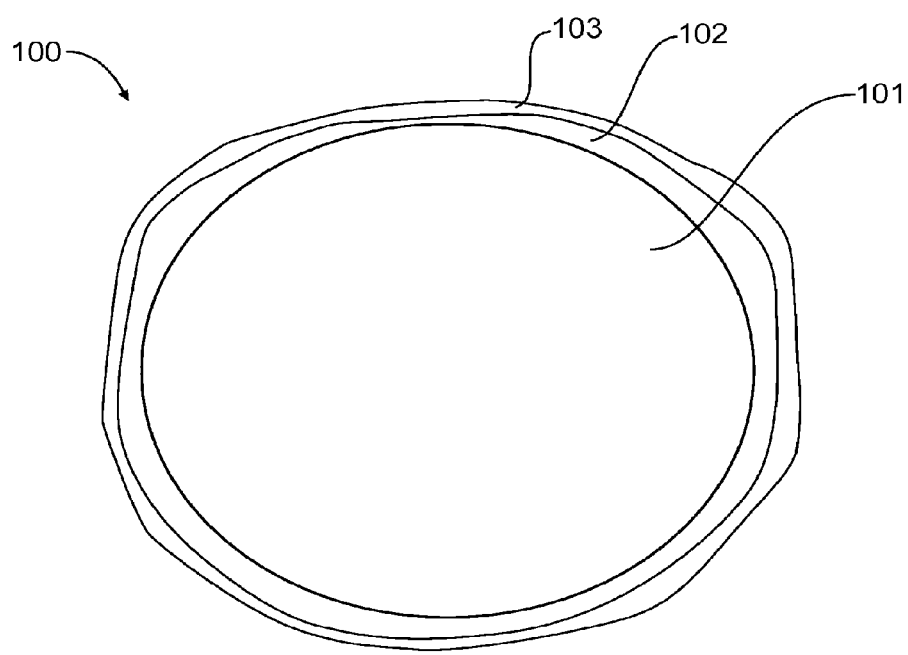
FIG. 1 depicts one embodiment of a kibble in the form of a coating on a core.

As used herein, the articles including "the", "a", and "an", when used in a claim or in the specification, are understood to mean one or more of what is claimed or described.

As used herein, the terms "include", "includes", and "including" are meant to be non-limiting.

As used herein, the term "plurality" means more than one.

As used herein, the term "kibble" includes a particulate pellet like component of animal feeds, such as dog and cat feeds, typically having a moisture, or water, content of less than 12% by weight. Kibbles may range in texture from hard to soft. Kibbles may range in internal structure from expanded to dense. Kibbles may be formed by an extrusion process. In non-limiting examples, a kibble can be formed from a core and a coating to form a kibble that is coated, also called a coated kibble. It should be understood that when the term "kibble" is used, it can refer to an uncoated kibble or a coated kibble.

As used herein, the terms "animal" or "pet" mean a domestic animal including, but not limited to domestic dogs, cats, horses, cows, ferrets, rabbits, pigs, rats, mice, gerbils, hamsters, horses, and the like. Domestic dogs and cats are particular examples of pets.

As used herein, the terms "animal feed", "animal feed compositions", "animal feed kibble", "pet food", or "pet food composition" all mean a composition intended for ingestion by a pet. Pet foods may include, without limitation, nutritionally balanced compositions suitable for daily feed, such as kibbles, as well as supplements and/or treats, which may or may not be nutritionally balanced.

As used herein, the term "nutritionally balanced" means that the composition, such as pet food, has known required nutrients to sustain life in proper amounts and proportion based on recommendations of recognized authorities, including governmental agencies, such as, but not limited to, Unites States Food and Drug Administration's Center for Veterinarian Medicine, the American Feed Control Officials Incorporated, in the field of pet nutrition, except for the additional need for water.

As used herein, the terms "Probiotic", "Probiotic component", "Probiotic ingredient", or "Probiotic organism" mean bacteria or other microorganisms, either viable or dead, their constituents such as proteins or carbohydrates, or purified fractions of bacterial ferments, including those in the dormant state and spores, that are capable of promoting mammalian health by preserving and/or promoting the natural microflora in the GI tract and reinforcing the normal controls on aberrant immune responses.

As used herein, the term "core", or "core matrix", means the particulate pellet of a kibble and is typically formed from a core matrix of ingredients and has a moisture, or water, content of less than 12% by weight. The particulate pellet may be coated to form a coating on a core, which may be a coated kibble. The core may be without a coating or may be with a partial coating. In an embodiment without a coating, the particulate pellet may comprise the entire kibble. Cores can comprise farinaceous material, proteinaceous material, and mixtures and combinations thereof. In one embodiment, the core can comprise a core matrix of protein, carbohydrate, and fat.

As used herein, the term "coating" means a partial or complete covering, typically on a core, that covers at least a portion of a surface, for example a surface of a core. In one example, a core may be partially covered with a coating such that only part of the core is covered, and part of the core is not covered and is thus exposed. In another example, the core may be completely covered with a coating such that the entire core is covered and thus not exposed. Therefore, a coating may cover from a negligible amount up to the entire surface. A coating can also be coated onto other coatings such that a layering of coatings can be present. For example, a core can be completed coated with coating A, and coating A can be completely coated with coating B, such that coating A and coating B each form a layer.

As used herein, the term "macronutrient" means a source, or sources, of protein, fat, carbohydrate, and/or combinations and/or mixtures thereof.

As used herein, the term "extrude" means an animal feed that has been processed by, such as by being sent through, an extruder. In one embodiment of extrusion, kibbles are formed by an extrusion processes wherein raw materials, including starch, can be extruded under heat and pressure to gelatinize the starch and to form the pelletized kibble form, which can be a core. Any type of extruder can be used, non-limiting examples of which include single screw extruders and twin-screw extruders.

The list of sources, ingredients, and components as described hereinafter are listed such that combinations and mixtures thereof are also contemplated and within the scope herein.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All lists of items, such as, for example, lists of ingredients, are intended to and should be interpreted as Markush groups. Thus, all lists can be read and interpreted as items "selected from the group consisting of" . . . list of items . . . "and combinations and mixtures thereof."

Referenced herein may be trade names for components including various ingredients utilized in the present disclosure. The inventors herein do not intend to be limited by materials under any particular trade name. Equivalent materials (e.g., those obtained from a different source under a different name or reference number) to those referenced by trade name may be substituted and utilized in the descriptions herein.

In the description of the various embodiments of the present disclosure, various embodiments or individual features are disclosed. As will be apparent to the ordinarily skilled practitioner, all combinations of such embodiments and features are possible and can result in preferred executions of the present disclosure. While various embodiments and individual features of the present invention have been illustrated and described, various other changes and modifications can be made without departing from the spirit and scope of the invention. As will also be apparent, all combinations of the embodiments and features taught in the foregoing disclosure are possible and can result in preferred executions of the invention.

Coated Kibble

Various non-limiting embodiments of the present invention include a pet food in the form of a coated kibble wherein the coated kibble includes a core and a coating at least partially covering the core. In one embodiment, the pet food, or coated kibble, can be nutritionally balanced. In one embodiment, the pet food, or coated kibble, can have a moisture, or water, content less than 12%. The kibble can be made and then coated, or late-stage differentiated, with a layering or coating of a dry protein source using a binder, which results in a coated kibble having an increased animal preference. Still other embodiments of the present invention include a method of making a pet food by forming a core mixture and forming a coating mixture and applying the coating mixture to the core mixture to form a coated kibble pet food. Additional embodiments of the present invention include a method of making a pet food including two heat treating *Salmonella* deactivation steps.

One embodiment of the present invention provides a pet food in the form of a coated kibble comprising a core, which can be extruded, a coating coated onto the core, wherein the coating comprises a protein component and a binder component. A depiction of one embodiment of a coated kibble is shown in FIG. 1. FIG. 1 illustrates a cross-section of a coated kibble 100. Coated kibble 100 comprises a core 101 and a coating 102 that surrounds core 101. While FIG. 1 illustrates a coating completely surrounding the core, as disclosed herein the coating can only partially surround the core. In one embodiment, the coating can comprise from 0.1% to 75% by weight of the entire coated kibble, and the core can comprise from 25% to 99.9% of the entire coated kibble. In other embodiments, the coating can comprise a range of any integer values between 0.1% and 75% by weight of the coated kibble, and the core can comprise a range of any integer values between 25% and 99.9% by weight of the coated kibble. The protein component can comprise from 50% to 99% of the coating, and the binder component can comprise from 1% to 50% of the coating. In other embodiments, the protein component can comprise a range of any integer values between 50% and 99% by weight of the coating, and the binder component can comprise a range of any integer values between 1% and 50% by weight of the coating. In additional embodiments, the core can have a moisture, or water, content less than 12% and can comprise a gelatinized starch matrix, which can be formed by way of the extrusion process described herein.

In one embodiment, the coated kibble comprises a core and a coating. The core can comprise several ingredients that form a core matrix. In one non-limiting example, the core can comprise a carbohydrate source, a protein source, and/or a fat source. In one embodiment, the core can comprise from 20% to 100% of a carbohydrate source. In one embodiment, the core can comprise from 0% to 80% of a protein source. In one embodiment, the core can comprise from 0% to 15% of a fat source. The core can also comprise other ingredients as well. In one embodiment, the core can comprise from 0% to 80% of other ingredients.

The carbohydrate source, or carbohydrate ingredient, or starch ingredient, can comprise cereals, grains, corn, wheat, rice, oats, corn grits, sorghum, grain sorghum/milo, wheat bran, oat bran, amaranth, Durum, and/or semolina. The protein source, or protein ingredient, can comprise chicken meals, chicken, chicken by-product meals, lamb, lamb meals, turkey, turkey meals, beef, beef by-products, viscera, fish meal, entrails, kangaroo, white fish, venison, soybean meal, soy protein isolate, soy protein concentrate, corn gluten meal, corn protein concentrate, distillers dried grains, and/or distillers dried grains solubles. The fat source, or fat ingredient, can comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

Other ingredients can comprise active ingredients, such as sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and still other ingredients. Sources of fiber ingredients can include fructooligosaccharides (FOS), beet pulp, mannanoligosaccharides (MOS), oat fiber, citrus pulp, carboxymethylcellulose (CMC), guar gum, gum arabic, apple pomace, citrus fiber, fiber extracts, fiber derivatives, dried beet fiber (sugar removed), cellulose, a-cellulose, galactooligosaccharides, xylooligosaccharides, and oligo derivatives from starch, inulin, psyllium, pectins, citrus pectin, guar gum, xanthan gum, alginates, gum arabic, gum talha, beta-glucans, chitins, lignin, celluloses, non-starch polysaccharides, carrageenan, reduced starch, soy oligosaccharides, trehalose, raffinose, stachyose, lactulose, polydextrose, oligodextran, gentioligosaccharide, pectic oligosacchaiide, and/or hemicellulose. Sources of mineral ingredients can include sodium selenite, monosodium phosphate, calcium carbonate, potassium chloride, ferrous sulfate, zinc oxide, manganese sulfate, copper sulfate, manganous oxide, potassium iodide, and/or cobalt carbonate. Sources of vitamin ingredients can include choline chloride, vitamin E supplement, ascorbic acid, vitamin A acetate, calcium pantothenate, pantothenic acid, biotin, thiamine mononitrate (source of vitamin B1), vitamin B12 supplement, niacin, riboflavin supplement (source of vitamin B2), inositol, pyridoxine hydrochloride (source of vitamin B6), vitamin D3 supplement, folic acid, vitamin C, and/or ascorbic acid. Sources of polyphenols ingredients can include tea extract, rosemary extract, rosemarinic acid, coffee extract, caffeic acid, turmeric extract, blueberry extract, grape extract, grapeseed extract, and/or soy extract. Sources of amino acid ingredients can include l-tryptophan, taurine, histidine, carnosine, alanine, cysteine, arginine, methionine, tryptophan, lysine, asparagine, aspartic acid, phenylalanine, valine, threonine, isoleucine, histidine, leucine, glycine, glutamine, taurine, tyrosine, homocysteine, ornithine, citrulline, glutamic acid, proline, and/or serine. Sources of carotenoid ingredients can include lutein, astaxanthin, zeaxanthin, bixin, lycopene, and/or beta-carotene. Sources of antioxidant ingredients can include tocopherols (vitamin E), vitamin C, vitamin A, plant-derived materials, carotenoids (described above), selenium, and/or CoQ1O (Co-enzyme Q1O). Sources of fatty acid ingredients can include arachidonic acid, alpha-linoleic acid, gamma linolenic acid, linoleic acid, eicosapentanoic acid (EPA), docosahexanoic acid (DHA), and/or fish oils as a source of EPA and/or DHA. Sources of glucose mimetic ingredients can include glucose anti-metabolites including 2-deoxy-D-glucose, 5-thio-D-glucose, 3-O-methylglucose, anhydrosugars including 1,5-anhydro-D-glucitol, 2,5-anhydro-D-glucitol, and 2,5-anhydro-D-mannitol, mannoheptulose, and/or avocado extract comprising mannoheptulose. Still other ingredients can include beef broth, brewers dried yeast, egg, egg product, flax meal, DL methionine, amino acids, leucine, lysine, arginine, cysteine, cystine, aspartic acid, polyphosphates such as sodium hexametaphosphate (SHMP), sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, L-carnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), anti-foaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solubilizing agents, suspending agents (non-surfactant), solvents, viscosity increasing agents (aqueous and non-aqueous), sequestrants, and/or keratolytics.

The Probiotic ingredient or component can comprise one or more bacterial probiotic microorganism suitable for pet consumption and effective for improving the microbial balance in the pet gastrointestinal tract or for other benefits, such as disease or condition relief or prophylaxis, to the pet. Various Probiotic microorganisms are known in the art. See, for example, WO 03/075676, and U.S. Published Application No. US 2006/0228448A1. In specific embodiments, the probiotic component may be selected from bacteria, yeast or microorganism of the genera *Bacillus, Bacteroides, Bifidobacterium, Enterococcus* (e.g., *Enterococcus faecium* DSM 10663 and *Enterococcus faecium* SF68), *Lactobacillus, Leuconostroc, Saccharomyces, Candida, Streptococcus*, and mixtures of any thereof. In other embodiments, the probiotic may be selected from the genera *Bifidobacterium, Lactobacillus*, and combinations thereof. Those of the genera *Bacillus* may form spores. In other embodiments, the probiotic does not form a spore. Non-limiting examples of lactic acid bacteria suitable for use herein include strains of *Streptococcus lactis, Streptococcus cremoris, Streptococcus diacetylactis, Streptococcus thermophilus, Lactobacillus bulgaricus, Lactobacillus acidophilus* (e.g., *Lactobacillus acidophilus* strain DSM 13241), *Lactobacillus helveticus, Lactobacillus bifidus, Lactobacillus casei, Lactobacillus lactis, Lactobacillus plantarum, Lactobacillus rhamnosus, Lactobacillus delbrukii, Lactobacillus thermophilus, Lactobacillus fermentii, Lactobacillus salvarius, Lactobacillus reuteri, Bifidobacterium longum. Bifidobacterium infantis,*

*Bifidobacterium bifidum, Bifidobacterium animalis, Bifidobacterium pseudolongum,* and *Pediococcus cerevisiae,* or mixtures of any thereof. In specific embodiments, the probiotic-enriched coating may comprise the bacterial strain *Bifidobacterium animalis* AHC7 NCIMB 41199. Other embodiments of the Probiotic ingredient may include one or more microorganisms identified in U.S. Published Application Nos. US 2005/0152884A1, US 2005/0158294A1, US 2005/0158293A1, US 2005/0175598A1, US 2006/0269534A1 and US 2006/0270020A1 and in PCT International Publication No. WO 2005/060707A2.

In at least one embodiment, a coating can be coated onto the core, described hereinabove. In at least one embodiment, the coating can be applied to the core to increase the animal preference, or pet acceptance or preference, of the coated kibble. Thus, the uncoated core can be late-stage differentiated by applying a coating, which can increase the animal preference and thus the pet acceptance or preference for the final coated kibble. In one embodiment, this uncoated core can be a core that has been already processed, including milling, conditioning, drying, and/or extruded, all as described herein.

The coating can comprise several coating components, or agents, that form a coating to coat the core of the kibble. In one non-limiting example, the coating can comprise a protein component and a binder component. In one embodiment, the coating can comprise from 50% to 99% of a protein component and from 1% to 50% of a binder component. The coating can also comprise other components as well, which can be applied with the protein component and/or binder component, or can be applied after application of the protein and/or binder component. In one embodiment, the coating can comprise from 0% to 70% of a palatant component. In one embodiment, the coating can comprise from 0% to 50% of a fat component. In one embodiment, the coating can comprise from 0% to 50% of other components.

In one embodiment, the coated kibble can have more than one coating. Thus, a first coating, second coating, third coating, and so on can be included. Each of these coatings can be comprised of any of the coating components as described herein.

In any of the embodiments described herein, the coating components can be considered a solids coating, solids component, or solids ingredient. Thus, this solids coating can comprise less than 12% moisture, or water, content. In one embodiment, the coating component comprises a protein component as a solids coating having less than 12% moisture, or water, content.

The coating as described herein can be a partial or complete covering on the surface of the core. In one example, a core may be partially covered with a coating such that only part of the core is covered, and part of the core is not covered and is thus exposed. In another example, the core may be completely covered with a coating such that the entire core is covered and thus not exposed. A coating can also be coated onto other coatings such that a layering of coatings can be present. For example, a core can be completely coated with a first coating component, and the first coating component can be completely coated with a second coating component such that the first coating component and the second coating component each form a separate layer. Of course, additional coating components can be added, such as third, fourth, fifth, sixth, up to the desired number of coating components. In one embodiment, each can form a separate layer. In another embodiment, each can form partial layers. In one embodiment, a plurality of coating components can form a single layer, and each layer more can be formed from one or a plurality of coating components.

The protein component can comprise chicken meals, chicken, chicken by-product meals, lamb, lamb meals, turkey, turkey meals, beef, beef by-products, viscera, fish meal, entrails, kangaroo, white fish, venison, soybean meal, soy protein isolate, soy protein concentrate, corn gluten meal, corn protein concentrate, distillers dried grains, distillers dried grains solubles, and single-cell proteins, for example yeast, algae, and/or bacteria cultures. One embodiment of a protein component comprises chicken by-product meal at less than 12% moisture, or water.

The binder component can comprise any of the following or combinations of the following materials: monosaccharides such as glucose, fructose, mannose, arabinose; di- and trisaccharides such as sucrose, lactose, maltose, trehalose, lactulose; corn and rice syrup solids; dextrins such a corn, wheat, rice and tapioca dextrins; maltodextrins; starches such as rice, wheat, corn, potato, tapioca starches, or these starches modified by chemical modification; oligosaccharides such as fructooligosccharides, alginates, chitosans; gums such as carrageen, and gum arabic; polyols such as glycerol, sorbitol, mannitol, xylitol, erythritol; esters of polyols such as sucrose esters, polyglycol esters, glycerol esters, polyglycerol esters, sorbitan esters; sorbitol; molasses; honey; gelatins; peptides; proteins and modified proteins such as whey liquid, whey powder, whey concentrate, whey isolate, whey protein isolate, high lactose whey by-product, such as DAIRYLAC® 80 from International Ingredient Corporation, meat broth solids such as chicken broth, chicken broth solids, soy protein, and egg white. These aforementioned binder components can be used in combination with water, especially when added. The binder material can be dissolved or dispersed in water, forming a liquid mixture or solution, which can then be applied over the surface of the core. The liquid mixture can facilitate both even dispersion of the binder component over the core surface and the interaction between the core surface and the protein component being applied to the surface of the core. In one embodiment, the liquid mixture can be an about 20% liquid mixture of binder component, which can be added to the kibble at 5% to 10% by weight of the kibble, which, on a dry matter basis, becomes about 1% to 2% by weight of the kibble.

In embodiments when a binder component is used, keeping the binder component on the surface of the core can be done, thus preventing, or at least attempting to minimize, absorption of the binder towards and into the core. In one embodiment, additives can be added to increase the viscosity of the binder solution. Those additives can be corn starch, potato starch, flour, and combinations and mixtures thereof. These additives can assist in keeping the binder component on the surface of the kibble to prevent or minimize absorption from the surface towards and into the core. In another embodiment, varying the temperature of the binder solution to thicken the solution can be done. For example, when using egg white as a binder component, denaturization of the proteins of the egg whites can create a gel-like solution. This formation of a gel-like solution can occur around 80° C., so in one embodiment raising the temperature of the binder solution to 80° C. can be performed. Additionally, the temperature of the core can be increased to also assist in minimizing the absorption of the binder towards the core. In another embodiment, additives and temperature variation as just described can also be done in combination.

Thus, in one embodiment, the binder component can act as a glue, or adhesive material, for the protein component to adhere to the core. In one embodiment, the protein component can be a solids ingredient at less than 12% moisture, or water, content, and the binder component can be a liquid. In one embodiment, the binder component can be applied to or layered onto the core to act as the glue for the protein component, which can then be applied to or layered onto the core with binder component. In another embodiment, the protein component as a solids ingredient can be mixed with the binder component, and then the mixture can be applied to or layered onto the core.

In one embodiment, lipids and lipid derivatives can also be used as binder components. Lipids can be used in combination with water and/or other binder components. Lipids can include plant fats such as soybean oil, corn oil, rapeseed oil, olive oil, safflower oil, palm oil, coconut oil, palm kernel oil, and partially and fully hydrogenated derivatives thereof; animal fats and partially and fully hydrogenated derivatives thereof; and waxes.

In one embodiment, it can be advantageous to minimize the interfacial tension between the coating and the kibble. Emulsifiers can be used in one embodiment to minimize such repulsive forces. The emulsifier can comprise an emulsifier comprising a plurality of hydroxyl groups. In other embodiments, emulsifiers such as mono- and diglycerides of fatty acids, mono- and diacetyl tartaric acid esters of mono- and diglycerides of fatty acids, sodium and calcium stearoyl-2-lactylates, mono- and diacetyl tartaric acid esters of mono- and diglycerides of fatty acids and sucrose esters of fatty acids, citric acid esters of mono- and diglycerides of fatty acids, lactic acid esters of mono- and diglycerides of fatty acids and polyglycerol esters, lecithins, polyglycerol esters and polysorbate esters can be mixed with the coating, forming an emulsifier and coating composition. Such emulsifier can be used to minimize the surface energy and interfacial tension between the coating and the kibble surface. Minimization of the surface energy of the coating has been associated with better adherence of the coating to the kibble by lowering the interfacial tension. Coatings can be any of the coatings as disclosed herein. Particular emulsifiers can include polysorbate esters such as Polysorbate 80. In one embodiment, the emulsifier can be used at from about 0.01% to about 10% by weight of the coating and emulsifier composition. Thus, the coating can be from about 90% to about 99.99% by weight of the coating and emulsifier composition. In other embodiments, the emulsifier can be present at from about 0.1% to about 2%, or from about 0.1% to about 1%, or from about 0.5% to about 1%, by weight. Accordingly, the coating can be from about 98% to about 99.9%, or from about 99% to about 99.9, or from about 99% to about 99.5%, by weight.

The surface energy is understood to mean the average surface energy of a representative area of a compressed powder, although localized variations may occur due to such factors as variation in mixing or grinding and texture. The surface energy of the compressed powder correlates to hydrophobicity and hydrophilicity, and may be representative of, for example, the moisture content of the powder. The surface energy of the compressed pellet is derived from contact angle measurements of liquids of known surface tension, which can be converted to surface energy by various accepted models that would be known to one of skill in the art. One such model, used in the present invention, is the Fowkes equation, as described in Fowkes, F. M.: *Industrial and Engineering Chemistry*, vol. 56, number 12, p. 40 (1964):

$$\gamma_{lv}(1+\cos\theta)=2(\gamma_{lv}^d\gamma_{sv}^d)^{1/2}+2(\gamma_{lv}^P\gamma_{sv}^P)^{1/2}$$

where 0 refers to the contact angle; $\gamma_{lv}$ refers to the surface tension of the liquid (solvent of known surface tension); $\gamma_{lv}^d$; refers to the dispersive component of the surface tension of the liquid; $\gamma_{sv}^d$ refers to the dispersive component of the surface tension of the solid (compressed pellet); $\gamma_{lv}^P$ refers to the polar component of the surface tension of the liquid and $\gamma_{sv}^P$ refers to the polar component of the surface tension of the solid. The contact angles of the compressed pellet herein were measured using diiodomethane (99%, Aldrich), formamide (99%+, Aldrich) and water (HPLC grade, Aldrich). The total surface energy of the compressed pellet is the sum of the dispersive surface energy component and the polar surface energy component, which is thought to affect properties such as adhesion of substances to the kibble.

A palatant component can be used in some embodiments. The palatant can comprise chicken flavor, such as liquid digest derived from chicken livers, which can be approximately 70% water and chicken liver digests. A palatant component as used herein means anything that is added to the animal feed for the primary purpose of improving food acceptance, or preference, by the animal. A palatant component, which can also be considered a flavor, a flavoring agent, or a flavoring component, can include a liver or viscera digest, which can be combined with an acid, such as a pyrophosphate. Non-limiting examples of pyrophosphates include, but are not limited to, disodium pyrophosphate, tetrasodium pyrophosphate, trisodium polyphosphates, tripolyphosphates, and zinc pyrophosphate. The palatant component can contain additional palatant aids, non-limiting examples of which can include methionine and choline. Other palatant aids can include aromatic agents or other entities that drive interest by the animal in the food and can include cyclohexanecarboxylic acid, peptides, monoglycerides, short-chain fatty acids, acetic acid, propionic acid, butyric acid, 3-methylbutyrate, zeolite, poultry hydrolysate, tarragon essential oil, oregano essential oil, 2-methylfuran, 2-methylpyrrole, 2-methyl-thiophene, dimethyl disulfide, dimethyl sulfide, sulfurol, algae meal, catnip, 2-Piperidione, 2,3 pentanedione, 2-ethyl-3,5-dimethypyrazine, Furfural, Sulfurol, and Indole. In addition, various meat based flavorants or aroma agents can be used, non-limiting examples include meat, beef, chicken, turkey, fish, cheese, or other animal based flavor agents.

The fat component can comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

The other components can comprise active ingredients, such as sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and still other ingredients. Sources of fiber ingredients can include fructooligosacchalides (FOS), beet pulp, mannanoligosaccharides (MOS), oat fiber, citrus pulp, carboxymethylcellulose (CMC), guar gum, gum arabic, apple pomace, citrus fiber, fiber extracts, fiber delivatives, dried beet fiber (sugar removed), cellulose, a-cellulose, galactooligosaccharides, xylooligosaccharides, and oligo derivatives from starch, inulin, psyllium, pectins, citrus pectin, guar gum, xanthan gum, alginates, gum arabic, gum talha, beta-glucans, chitins, lignin, celluloses, non-starch polysacchalides, carrageenan, reduced starch, soy oligosaccharides, trehalose, raffinose, stachyose, lactulose, polydextrose, oligodextran, gentioligosacchalide, pectic oligosacchalide, and/or hemicellulose. Sources of mineral ingredients can include sodium selenite, monosodium phosphate, calcium carbonate, potassium chloride, ferrous sulfate, zinc oxide, manganese sulfate, copper sulfate, manganous oxide, potassium iodide, and/or cobalt carbonate. Sources of vitamin ingredients can include choline chloride, vitamin E supplement, ascorbic acid, vitamin A acetate, calcium pantothenate, pantothenic acid, biotin, thiamine mononitrate (source of vitamin B1), vitamin B12 supplement, niacin, riboflavin supplement (source of vitamin B2), inositol, pyridoxine hydrochloride (source of vitamin B6), vitamin D3 supplement, folic acid, vitamin C, and/or ascorbic acid. Sources of polyphenols ingredients can include tea extract, rosemary extract, rosemarinic acid, coffee extract, caffeic acid, turmeric extract, blueberry extract, grape extract, grapeseed extract, and/or soy extract. Sources of amino acid ingredients can include 1-Tryptophan, Taurine, Histidine, Carnosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Taurine, Tyrosine, Homocysteine, Ornithine, Citruline, Glutamic acid, Proline, and/or Serine. Sources of carotenoid ingredients can include lutein, astaxanthin, zeaxanthin, bixin, lycopene, and/or beta-carotene. Sources of antioxidant ingredients can include tocopherols (vitamin E), vitamin C, vitamin A, plant-derived materials, carotenoids (described above), selenium, and/or CoQ1O (Co-enzyme Q1O). Sources of fatty acid ingredients can include arachidonic acid, alpha-linoleic acid, gamma linolenic acid, linoleic acid, eicosapentanoic acid (EPA), docosahexanoic acid (DHA), and/or fish oils as a source of EPA and/or DHA. Sources of glucose mimetic ingredients can include glucose anti-metabolites including 2-deoxy-D-glucose, 5-thio-D-glucose, 3-0-methylglucose, anhydrosugars including 1,5-anhydro-D-glucitol, 2,5-anhydro-D-glucitol, and 2,5-anhydro-D-mannitol, mannoheptulose, and/or avocado extract comprising mannoheptulose. Still other ingredients can include beef broth, brewers dried yeast, egg, egg product, flax meal, DL methionine, amino acids, leucine, lysine, arginine, cysteine, cystine, aspartic acid, polyphosphates such as sodium hexametaphosphate (SHMP), sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, L-carnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), antifoaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solubilizing agents, suspending agents (non-surfactant), solvents, viscosity increasing agents (aqueous and non-aqueous), sequestrants, and/or keratolytics.

The Probiotic ingredient or component can comprise one or more bacterial Probiotic microorganisms suitable for pet consumption and effective for improving the microbial balance in the pet gastrointestinal tract or for other benefits, such as disease or condition relief or prophylaxis, to the pet. Various Probiotic microorganisms are known in the art. See, for example, WO 03/075676, and U.S. Published Application No. US 2006/0228448A1. In specific embodiments, the probiotic component may be selected from bacteria, yeast or microorganism of the genera *Bacillus, Bacteroides, Bifidobacterium, Enterococcus* (e.g., *Enterococcus faecium* DSM 10663 and *Enterococcus faecium* SF68), *Lactobacillus, Leuconostroc, Saccharomyces, Candida, Streptococcus*, and mixtures of any thereof. In other embodiments, the Probiotic may be selected from the genera *Bifidobacterium, Lactobacillus*, and combinations thereof. Those of the genera *Bacillus* may form spores. In other embodiments, the Probiotic does not form a spore. Non-limiting examples of lactic acid bacteria suitable for use herein include strains of *Streptococcus lactis, Streptococcus cremoris, Streptococcus* diacetylactis, *Streptococcus thermophilus, Lactobacillus bulgaricus, Lactobacillus acidophilus* (e.g., *Lactobacillus acidophilus* strain DSM 13241), *Lactobacillus helveticus, Lactobacillus bifidus, Lactobacillus casei, Lactobacillus lactis, Lactobacillus plantarum, Lactobacillus rhamnosus, Lactobacillus delbrukii, Lactobacillus thermophilus, Lactobacillus fermentii, Lactobacillus salvarius, Lactobacillus reuteri, Bifidobacterium longum, Bifidobacterium infantis, Bifidobacterium bifidum, Bifidobacterium animalis, Bifidobacterium pseudolongum*, and *Pediococcus cerevisiae*, or mixtures of any thereof. In specific embodiments, the Probiotic-enriched coating may comprise the bacterial strain *Bfidobacterium animalis* AHC7 NCIMB 41199. Other embodiments of the Probiotic ingredient may include one or more microorganisms identified in U.S. Published Application Nos. US 2005/0152884A1, US 2005/0158294A1, US 2005/0158293A1, US 2005/0175598A1, US 2006/0269534A1, and US 2006/0270020A1 and in PCT International Publication No. WO 2005/060707A2.

These active ingredients can be provided in any form, such as in a dry form. A dry form of an active can be a form that comprises less than 12% moisture, or water, and thus can be considered a solids ingredient. Thus, in one embodiment, a Probiotic component can be provided in a dry form as a powder, such as with an average particle size of less than 100 micrometers. At less than 100 micrometers, the Probiotic component can be adhered more easily to the kibble. In one embodiment, Probiotic components can have a particle size greater than 100 micrometers. However, in this embodiment, more binder can be used to aid in adherence of the Probiotic to the kibble. The Probiotic component in the form of a dry powder can be applied as part of the coating to the core, resulting in a coated kibble having a Probiotic in the coating.

Thus, the coating can comprise active ingredients. Therefore, one embodiment of the present invention relates to a method of delivering active ingredients to a pet or animal, wherein the active ingredients can comprise any of the active ingredients disclosed herein, including mixtures and combinations thereof. In one embodiment, a pet food in the form of a coated kibble is provided. The coated kibble can comprise a core as described herein, and the coated kibble can comprise a coating as disclosed herein. In one embodiment, the coating comprises coating components, comprising a protein component as disclosed herein, a binder component as described herein, a fat component as described herein, a palatant component as described herein, and active ingredients as described herein. In one embodiment, the protein component, the fat component, and the palatant component, and combinations and mixtures thereof, can act as a carrier for the active ingredient. In another embodiment, the active ingredients can be a solids ingredient, such that the moisture, or water, content is less than 12%. The pet food in the form of a coated kibble, comprising active ingredients, can be provided to a pet or animal for consumptions. The active ingredient can comprise from 0.01% to 50% of the coating.

Thus, embodiments of the present invention contemplate coated kibbles comprising at least one active ingredient. Thus, one embodiment of the present invention relates to delivering active ingredients through a coated kibble in accordance with embodiments of the coated kibble as disclosed herein. It has been found that a coated kibble of embodiments of the present invention can increase animal preference of the coated kibble comprising an active ingredient and can increase the stability of the active ingredient.

Still other components can comprise components that can assist in reducing water transmission within the coated kibble. Components can include cocoa butter, palm kernel oil, palm oil, cottonseed oil, soybean oil, canola oil, rapeseed oil, hydrogenated derivatives of oils or fats, paraffin, wax, liquid paraffin, solid paraffin, candelilla wax, carnauba wax, microcrystalline wax, beeswax, capric acid, myristic acid, palmitic acid, stearic acid, acetyl acyl glycerols, shellac, dewaxed gumlac, triolein, peanut oil, chocolate, methylcellulose, stearic acid, hydroxypropylmethylcellulose, glycerol monostearate, methylcellulose, polyethylene glycol, behinic acid, adipic acid, carboxymethylcellulose, butter oil, pectin, acetylated monoglyceride, wheat gluten, oleic acid, soy lecithin, paraffin wax, paraffin oil, sodium caseinate, lauric acid, whey protein isolate, whey protein concentrate, stearyl alcohol, olestra, acetylated monoglycerides, chocolate liquor, sweet milk chocolate, cocoa solids, tristearin, animal fat, and/or poultry fat.

In one embodiment of the present invention, the protein component of the coating can be a dry component, or a solids ingredient, such that the water content of the protein component is less than 12%. Therefore, in this embodiment, the protein component, or solids ingredient, can act as a solid-like material that can be coated onto a core by using a binder ingredient. A protein component having less than 12% moisture, or water, can be extremely difficult to coat onto a core, or kibble, which itself can have a low moisture, or water, content, even less than 12%, as described herein. Thus, a binder component can assist in the coating of the dry protein component onto the core, or kibble.

In one embodiment, the finished coated kibble can comprise from 80% to 90% core and from 10% to 20% coating. The core can comprise from 45% to 55% carbohydrate source, from 35% to 45% protein source, from 0.1% to 5% fat source, and from 5% to 10% other ingredients. The coating can comprise from 65% to 75% protein component, a non-limiting example of which can be chicken by-product meal, from 5% to 10% binder component, a non-limiting example of which can be egg white, high lactose whey by-product, whey protein isolate or chicken broth, from 15% to 25% fat component, a non-limiting example of which can be chicken fat, and from 1% to 10% palatant component, a non-limiting example of which can be chicken liver digest. The coated kibble can comprise less than 12% water.

Macronutrients that can be included in the kibble of embodiments of the present invention can include protein sources/ingredients/components, fat sources/ingredients/components, and carbohydrate sources/ingredients/components, and mixtures and combinations thereof, all as described hereinabove. The macronutrient can be selected from the group consisting of protein sources/ingredients/components, fat sources/ingredients/components, carbohydrate sources/ingredients/components, and combinations and mixtures thereof, all as described hereinabove. These macronutrients can be distributed between the core and the coating such that the core comprises a particular amount of the macronutrients, and the coating comprises a particular amount of the macronutrients, all as a whole. In one embodiment, the distribution of the macronutrients between the core and the coating can be in a ratio of 12 to 1. In one embodiment, the distribution of the macronutrients between the core and the coating can be in a ratio of 1 to 12. In one embodiment, the distribution of the macronutrients between the core and the coating can be between a ratio of 12 to 1 and 1 to 12 and all integer values therebetween. The distribution of the macronutrients, as described, is as a mixture of the macronutrients of protein sources/ingredients/components, fat sources/ingredients/components, and carbohydrate sources/ingredients/components. Thus, in one embodiment in which the distribution of macronutrients ratio is 12 to 1 between the core and the coating, this embodiment represents a distribution of total protein sources/ingredients/components, fat sources/ingredients/components, and carbohydrate sources/ingredients/components, as a sum, of 12 to 1 between the core and the coating. Thus, in this embodiment, a ratio of 12 units of protein plus fat plus carbohydrate to 1 unit of protein plus fat plus carbohydrate exists.

Process

The kibble embodiments of the present invention may be formed by an extrusion process whereby the core ingredients, after formed into a core matrix, as described hereinabove, are extruded under heat and pressure to form a pelletized kibble form, or core pellet. During the extrusion process, if a starch matrix is employed, it may and typically does become gelatinized under the extrusion conditions.

In one embodiment, the extruding of the core matrix may be done using a single screw extruder, while other embodiments may be done using a twin-screw extruder. Extrusion of the core matrix may require specific configurations of the extruder to produce a material suitable for a kibble pet food. For example, very high shears and low extrusion times may be necessary to prevent significant color degradation and prevent polymerization of the material within the extruder and to produce kibbles that are durable for further processing, such as coating with one or more coatings.

In one embodiment, the coated kibble may be manufactured by contacting a mass of core pellets, such as may be produced by extrusion, and a coating component in a counter-rotating dual-axis paddle mixer.

In one embodiment, the ingredients used for a core matrix for forming into a core, or core material, may be any individual starting components, including, but not limited to, the sources/ingredients described hereinabove.

Processes common to making dry pet foods are milling, batching, conditioning, extrusion, drying, and coating. Milling encompasses any process used to reduce whole or partial ingredients into smaller forms. Whole or partial formulations are created in the process step for batching by mixing dry and/or liquid ingredients. Often these ingredients are not in the most nutritious or digestible form and thus processes are needed to further convert these ingredients to a digestible form via some sort of cooking process.

During the milling process, the individual starting components of the core material can be mixed and blended together in the desired proportions to form the core material.

In one embodiment, the resulting core material may be screened to remove any large agglomerate of material therefrom. Any sort of conventional solids mixer can be used for this step including, but not limited to, plough mixers, paddle mixers, fluidizing mixers, conical mixers, and drum mixers. One skilled in the art of solids mixing would be able to optimize the mixing conditions based on the types of materials, particle sizes, and scale, from any one of a number of widely available textbooks and articles on the subject of solids mixing.

The core material mixture can then be fed into a conditioner. Conditioning may be used to pretreat the ingredients and can include hydration, addition/mixing of other ingredients, and partial cooking. Cooking can often be accomplished by the addition of heat in the form of steam and can result in discharge temperatures of from 1 13° F. to 212° F. Pressurized conditioning may be used when temperatures need to be elevated above standard atmospheric conditions, such as at greater than 212° F. Conditioned ingredients and/or ingredients, or combinations thereof, can then be transferred to an extruder for further processing.

The core material, so conditioned, can then be subjected to an extrusion operation in order to obtain an expanded core pellet. In one embodiment, the core material may be routed to a hopper prior to the extrusion operation. The extruder may be any suitable single or twin screw cooking extruder. Suitable extruders may be obtained from Wenger Manufacturing Inc., Clextral SA, Buhler AG, and the like. The extruder operating conditions may vary depending on the particular product to be made. For example, the texture, hardness, or bulk density of the extruded product may be varied using changes in the extruder operating parameters. Similar to conditioning, extrusion can be used to incorporate other ingredients (non-limiting examples of which are carbohydrates, proteins, fats, vitamins, minerals, and preservatives) by having dry and/or liquid ingredient streams added anywhere along the length of the extruder feed port, barrel, or die. Extruders are often, but not limited to, single- or twin-screw in design and operate up to 1700 rpm. The extrusion process can often be accompanied with high pressure (up to 1500 15 psig) and high temperature (up to 250° C.). Extrusion can be used to accomplish the making of continuous ropes or sheets but also discrete shapes and sizes of edible food. These forms, shapes, and sizes are often the result of forcing the materials through a die or set of die openings and cutting or breaking into smaller segments.

At this stage, the extruded product can be in any form, such as extruded ropes, sheets, shapes, or other segments, and can be in an expanded moist pellet form that can then be transferred to post-extrusion operations. These can include crimping, shredding, stamping, conveying, drying, cooling, and/or coating in any combination or multiple of these. Crimping is any process that pinches food together. Shredding is any process that reduces the size of the food upon extrusion, preferably by tearing. Stamping is any process that embosses a surface or cuts through a food. Conveying is used to transport food from one operation to another and may change or maintain the state of the food during transport; often this process is mechanical or pneumatic. Drying can be used to reduce process moisture, or water, to levels suitable for shelf-life in the finished product. As an expanded moist pellet, such as a kibble, the pellets can be transported from the extruder outlet to a dryer, such as a dryer oven, by a conveying, airveying, or auguring system. After expansion and transport to the entrance to the dryer, the kibbles can typically have been cooled to between 85° C. and 95° C. and kibble moisture, or water, reduced by evaporation from about 25-35% to about 20-28%. The temperature of the drying oven may be from 90° C. to 150° C. The temperature of the core pellets exiting the drying oven may be from 90° C. to 99° C. At this stage, coating of the pellets can be performed. Coating can be performed to add carbohydrates, proteins, fats, water, vitamins, minerals, and other nutritional or health benefit ingredients to the food to make an intermediate or finished product. Cooling of the core pellets can be used to reduce the temperature from extrusion and/or drying.

Thus, at this stage, the core pellets, or core, can be considered cooked such that any starch component that was used can be gelatinized. The core pellets can then be fed to a fluidizing mixer for the application of a coating in the manufacture of a food pellet, such as a coated kibble. In one embodiment, the core pellets may be routed to a hopper prior to entering the fluidizing mixer. The coated kibble may be formed by contacting the core with a coating in a fluidizing mixer. In one embodiment, the fluidizing mixer can be a counter-rotating dual-axis paddle mixer, wherein the axes can be oriented horizontally with paddles attached to the counter-rotating axes. A suitable counter-rotating dual-axis paddle mixer may be obtained from Forberg International AS, Larvik, Norway; Eirich Machines, Inc, Gurnee, Ill., USA, and Dynamic Air Inc., St. Paul, Minn., USA. The motion of the paddles in-between the shafts constitutes a converging flow zone, creating substantial fluidization of the particles in the center of the mixer. During operation of the mixer, the tilt of paddles on each shaft may create opposing convective flow fields in the axial directions generating an additional shear field in the converging flow zone. The downward trajectory of the paddles on the outside of the shafts constitutes a downward convective flow.

In one embodiment, the fluidizing mixer can have a converging flow zone located in-between the counter-rotating paddle axes. In one aspect, the swept volumes of said counter-rotating paddle axes overlap within the converging flow zone. As used herein, the term "swept volume" means the volume that is intersected by a mixing tool attached to a rotating shaft during a full rotation of the shaft. In one aspect, the swept volumes of the counter-rotating paddle axes do not overlap within the converging flow zone. In one aspect, a gap can exist in the converging flow zone between the swept volumes of the counter-rotating paddle axes.

As described above, in one embodiment, the coating can comprise a protein component and a binder component. In one embodiment, the protein component and the binder component are mixed together into a single mixture or pre-mixed coating, prior to addition to the mixer. In another embodiment, the protein component and the binder component are not mixed together into a single mixture prior to addition to the mixer.

In one embodiment, the pre-mixed coating can be introduced or fed into the counter-rotating dual-axis paddle mixer such that the pre-mixed coating is directed upward into the converging zone between the counter-rotating paddle axes. The counter-rotating dual axis paddle mixer can have a converging flow zone between the counter-rotating paddle axes. Either overlapping or non-overlapping paddles can be used. The pre-mixed coating can be directed into the gap between the swept volumes of the counter-rotating paddle axes. In one aspect, the ingress of the pre-mixed coating into the dual-axis paddle mixer can occur through a distributor pipe located below the converging flow zone of the counter-rotating paddle axes. The distributor pipe can comprise at least one opening through which the coating passes into the dual-axis paddle mixer. In one aspect, the ingress of the pre-mixed coating into the dual-axis paddle mixer can occur by adding the pre-mixed coating along the side or sides of the mixer, preferably the sides parallel to the paddles axles. Material is swept downward to the bottom of the mixer and then is swept back upward into the converging flow zone of the counter-rotating paddle axes.

In one embodiment, the pre-mixed coating can be introduced into the counter-rotating dual-axis paddle mixer such that the pre-mixed coating is directed downward on top of the converging zone between the counter-rotating paddle axes. In one embodiment, the pre-mixed coating can be introduced into the counter-rotating dual-axis paddle mixer such that the pre-mixed coating is directed downward into the convective flow on the outside of the counter-rotating paddle axes.

In one embodiment, the coating components, such as the protein component, fat component, binder component, and/or palatant component, and combinations and mixtures thereof, can be separately introduced into the counter-rotating dual-axis paddle mixer such that the coating components are directed upward into the converging zone between the counter-rotating paddle axes. The counter-rotating dual axis paddle mixer may have a converging flow zone between the counter-rotating paddle axes. The coating components can be directed into the gap between the swept volumes of the counter-rotating paddle axes. In one aspect, the ingress of the coating components into the dual-axis paddle mixer can occur through a distributor pipe located below the converging flow zone of the counter-rotating paddle axes. The distributor pipe may comprise at least one opening through which the coating component passes into the dual-axis paddle mixer. In one aspect, the ingress of the coating component into the dual-axis paddle mixer can occur by adding the separate coating component along the side or sides of the mixer, preferably the sides parallel to the paddles axles. Material is swept downward though to the bottom of the mixer and then is swept back upward into the converging flow zone of the counter-rotating paddle axes.

In one embodiment, the coating components can be separately introduced into the counter-rotating dual-axis paddle mixer such that the coating components are directed downward on top of the converging zone between the counter-rotating paddle axes. In one embodiment, the coating components can be introduced into the counter-rotating dual-axis paddle mixer such that the coating components are directed downward into the convective flow on the outside of the counter-rotating paddle axes.

In one embodiment, the protein component can be introduced into the counter-rotating dual-axis paddle mixer such that the protein component is directed upward into the converging zone between the counter-rotating paddle axes. The counter-rotating dual axis paddle mixer can have a converging flow zone between the counter-rotating paddle axes. The protein component can be directed into the gap between the swept volumes of the counter-rotating paddle axes. In one aspect, the ingress of the protein component into the dual-axis paddle mixer can occur through a distributor pipe located below the converging flow zone of the counter-rotating paddle axes. The distributor pipe may comprise at least one opening through which the protein component passes into the dual-axis paddle mixer. In one aspect, the ingress of the protein component into the dual-axis paddle mixer can occur by adding the protein component along the side or sides of the mixer, preferably the sides parallel to the paddles axles. Material is swept downward to the bottom of the mixer and then is swept back upward into the converging flow zone of the counter-rotating paddle axes.

In one embodiment, the binder component can be introduced into the counter-rotating dual-axis paddle mixer such that the binder component is directed downward on top of the converging zone between the counter-rotating paddle axes.

In one embodiment, a single fluidizing mixing unit can be employed. In one embodiment, multiple fluidizing mixing units are employed such as, for example, cascading mixers of different coating components for coating on the core pellet. In one embodiment, multiple mixers may be employed, such as, for example, cascading mixers of progressively increasing volume capacity. It is believed that the increase in volume capacity may accommodate an increase in product capacity. In one embodiment, the coating process can occur at least once. In one embodiment, the coating process may occur as many times as desired to manufacture the desired food pellet. In one embodiment, the coating process may be repeated as many times as determined to be sufficient by one of ordinary skill to increase the core pellet mass by a factor of more than about 1.04 to about 4 when compared to the initial mass of the core pellet.

In one embodiment, the binder component can be introduced into the mixing unit. Application of the binder component can begin prior to application of the protein component. After the beginning of the application of the binder component, but while binder component is still being applied, application of the protein component can begin. Thus, a core coated with a binder component and a protein component can be formed. After this coated core is formed, a *Salmonella* deactivation step, as described hereinafter, can be performed. After this *Salmonella* deactivation step, a fat component and a palatant component can be introduced into the mixing unit as additional coating components.

In one embodiment, the protein component and the binder component can be introduced into the mixing unit as coating components at substantially the same time. Thus, a core coated with a binder component and a protein component can be formed. After this coated core is formed, a *Salmonella* deactivation step, as described hereinafter, can be performed. After this *Salmonella* deactivation step, a fat component and a palatant component can be introduced into the mixing unit as additional coating components.

In other embodiments, application of the protein component, binder component, fat component, and palatant component can be performed in any order and with any amount of overlapping of application times.

In one embodiment, the gap between a paddle tip and fluidizing mixer wall can be greater than the largest dimension of the core pellet being coated. While not being bound by theory, it is believed that such a gap clearance prevents the core pellets from becoming lodged between the paddle tip and the wall, possibly causing core pellet breakage.

In one embodiment, the gap between a paddle tip and fluidizing mixer wall can be smaller than the smallest dimension of the core pellet being coated. While not being bound by theory, it is believed that such a gap clearance prevents the core pellets from becoming lodged between the paddle tip and the wall, possibly causing core pellet breakage.

In one embodiment, the temperature of the core pellets at the start of the coating process is from 1° C. to 40° C. lower than the melting point temperature of the higher melting point temperature component. Too high of a core pellet temperature may result in a delay of the coating component crystallizing onto the surface of the core pellet which may lead to loss of the coating component from the core pellet or uneven distribution of the coating component either upon the individual core pellets or among the individual core pellets. Too low of a temperature of the core pellets may cause the higher melting point temperature component droplets to immediately crystallize on touching the surface of the core pellets.

In one embodiment, the coating component contacts the surface of the core pellet as a liquid and remains liquid for a brief period of time to allow the coating component to spread among the core pellets through surface contact among the core pellets as the core pellets are mixed in the fluidizing mixer. In one embodiment, the coating component remains a liquid for a time period from 1 second to 15 seconds. Without being bound by theory, it is believed that if the temperature of the core pellets or the higher melting point temperature component is too low that it would cause the higher melting point temperature component to solidify too soon in the manufacturing process. It is believed that it is the early solidification of the higher melting point temperature component that leads to difficulties such as agglomeration, stickiness, and uneven coating.

In one embodiment, the temperature of the core pellets at the start of the coating process will be at ambient temperature or above ambient temperature. A process may provide the core pellets at ambient or greater than ambient temperature. Coatings that do not derive an advantage from cooling the core pellets for reasons of crystallization or viscosity increase may derive an advantage with using the core pellets directly as provided to the mixer and not cooling the core pellets.

In one embodiment, the core pellets and the coating component can be introduced into the paddle mixer at separate times but at substantially identical physical locations. In one embodiment, the core pellets and the coating can be introduced into the paddle mixer at the same time and substantially identical physical locations. In one embodiment, the core pellets and the coating can be introduced into the paddle mixer at separate times and at separate locations. In one embodiment, the core pellets and the coating can be introduced into the paddle mixer at the same time and separate locations. In one embodiment, the core pellets can be added to the mixer, the mixer is started, and fluidization of the kibbles begins. The kibbles can be optionally further cooled by introducing a stream of cold air or gas such as carbon dioxide. The coating can then be added down the side of the mixer. By introducing the material to be coated down the side of the mixer, the material can be swept down with the descending core flow across the bottom of the mixer then up into the fluidized zone with the core, where all of it can be coated. When the coating is added down the side(s), it not only gets swept down with the core flow, then up towards the center, it also can be intimately mixed and dispersed with the cores. The cores are not only getting swept down, then up and around, but at the same time they are moving around the mixer from side to side.

In one embodiment, the coating process may have an average core pellet residence time in the dual-axis paddle mixer of from 0 minutes to 20 minutes. In one embodiment, the core pellet residence time in the dual-axis paddle mixer may be from 0.2, 0.4, 0.5, or 0.75 minutes to 1, 1.5, 2, 1.5, or 3 minutes.

The Froude number of the mixer, whether batch or continuous, can be greater than 0.5, or even greater than 1.0, during operation of forming a coated kibble. The Froude number is defined as a dimensionless number $(Fr)=(V^2/Rg)$ and relates inertial forces to those of gravity; R is the length of the paddle from the centerline of the axle to the tip of the paddle (cm), V is the tip speed of the paddle (cm/sec), and g is the gravitational constant. The Froude number is a dimensionless number comparing inertial forces and gravitational forces. The inertial forces are the centrifugal forces that are mixing the cores and coatings. No material properties are accounted for in the Froude number. When the Froude number is greater than about 1, the centrifugal forces hurling the cores and other material up in the center are greater than the gravitational forces pulling them back down. Thus, the kibbles are briefly suspended in air. In this state, materials such as coating materials can move freely around, and onto, the core, thus ensuring close to even, and including even, coating. In one embodiment, if the Froude number is too high, the kibble may be thrown against the top and/or the sides of the mixer with such force as to crack, chip, or break the kibbles, or, if the top of the mixer is open, the kibbles may be ejected from the mixer entirely. In one embodiment, the Froude number can be above about 0.5 and below about 3.

If the binder component is added separately over the top of the fluidized zone of the mixer, and the protein component is added separately below the fluidized zone, it may be effective to split the protein components into two streams and introduce the streams at opposite corners of the mixer, one on either side of the binder addition zone whereby the protein component(s) travel downward along the side or sides of the mixer, preferably the sides parallel to the paddles axles. Material is swept downward to the bottom of the mixer and then is swept back upward into the converging flow zone of the counter-rotating paddle axes.

Without being limited by theory, it is believed that this sets up two convective loops of protein components circulating in the mixer, one on either side of the binder addition zone. A single complete circuit of the protein components through a convective loop is referred to as the convective cycle time. It is believed that holding the convective cycle time constant regardless of the size of the mixer can achieve a similar distribution of the coating over the surface of the core pellets regardless of the size of the mixer.

It may often be convenient to include more than one binder component spray zone on the top of the fluidized zone in order to improve the evenness of the coating. Each binder addition zone may include two protein addition points, one on either side of the individual spray zone. The protein addition points can be below the fluidized zone, and the binder addition points can be above the fluidized zone of the mixer. Thus, two separate binder addition points above the fluidized zone of the mixer can include four separate binder addition points below the fluidized zone.

The binder flux is defined as the amount of binder component in grams that passes downward though a given area on the top of the fluidized zone. The coating addition flux is defined as the amount of coating component in grams through the same given area upward through the fluidized zone. The dimensionless flux is defined as the binder flux divided by the coating flux and the number of convective loops in the mixer. While not being limited by theory, it is believed that holding the dimensionless flux constant regardless of the size of the mixer can help achieve a similar distribution of the coating over the surface of the core pellets regardless of the size of the mixer.

If a water-based binder is used to apply the coating, or if the product has had steam applied after the coating step as described herein, it may be desirable to dry the product in one embodiment. Drying can be accomplished by any of the methods described herein. The exact conditions of the drying will depend on the type of dryer used, the amount of moisture, or water, removed, the temperature sensitivity of the applied coating, and the final moisture, or water, level of the product required. One skilled in the art would be able to adjust these factors appropriately to achieve the desired product. Additionally, drying can be performed in the mixer where the coating took place. A stream of dry air at a temperature elevated above ambient can be passed over the product at a sufficient rate to remove the amount of moisture, or water, required over the time period required. In one embodiment, using a fluidized mixer, the air can be directed on top of the product, directly over the center of the fluidized zone, while the product is being agitated. In one embodiment, the air can be directed down one or both sides of the mixer so that the flow of the air is the forced upward through the fluidized zone. In one embodiment, the air can be introduced into the mixer by means of manifolds on the inside walls of the mixer. In one embodiment, the air can be introduced into the mixer by means of a manifold at the bottom of the mixer, below the fluidized zone. One skilled in the art would be able to adjust the mixer agitation rate to compensate for any effects on the fluidized behavior of the product by the introduction of air flow.

In one embodiment the fluidizing mixer can be a continuous fluidizing mixer. Many commercial processes are continuous flow processes. A continuous process can have the advantages of a lower cost and greater operating efficiency than a batch process, especially as the amount of material being processed increases. The core material may be continuously introduced into the mixer at one end of the mixer. The mass flow of the cores combined with the angle on the paddle blades cause the kibbles to move through the bed to the other end of the mixer, where they continuously exit the mixer. The continuous flow of kibble into the mixer and the continuous flow of the kibbles out of the mixer are adjusted so that the flows are mass balanced and steady state, and the amount of kibble at any one time inside the mixer is approximately constant. The paddles are at an angle such that the kibbles are fluidized, yet maintain a forward flow through the mixer. In a batch fluidizing mixer, the paddles are angled so that the cores are fluidized in the converging zone, and at the same time there is a convective flow of the cores in a circular pattern around the perimeter of the mixer. Unlike the batch fluidized bed mixer, the paddles for the continuous fluidized bed mixer are angled so that the core materials flow along the length of the mixer parallel to both axles. In one embodiment, the rotation of the paddles can be counter-rotating such that the paddles cause the core materials to have an upward convective flow of core material in or near the center of the mixer and a downward convective flow along the sides of the mixer. In another embodiment, the rotation of the paddles can be counter-rotating such that the paddles cause the core materials to have a downward convective flow of core material in or near the center of the mixer and an upward convective flow along the sides of the mixer. The angle of the paddles should be adjusted so that there is proper upward and downward convective flow and the core materials are fluidized in the center. The angle of the paddles should also be adjusted so that the core materials remain in the mixer for the desired amount of time for substantially even coating. In one embodiment, the continuous mixer can be operated so that the Froude number is between about 0.8 and about 3, or from about 0.8 and about 2, or from about 0.8 to about 1.2, or about 1.

It is desirable that the flow of the core material through the continuous mixer be substantially plug flow. Plug flow is defined as the minimization of axial mixing. Axial mixing is defined as the tendency of an aliquot of core materials to spread away from one another in the direction of the mass flow of the core material. When flow of the core material is substantially plug flow, the core materials are in the mixer for approximately the same amount of time. With increasing axial mixing, the times that the cores spend in the mixer can vary somewhat, possibly resulting in more uneven coating from core particle to another. The amount of axial mixing in a mixer can be calculated according to a method described in Levenspiel in "Chemical Reaction Engineering". The Peclet number is a measurement of the amount of axial mixing and degree of plug flow. The Peclet number is a dimensionless number that is the ratio of the axial mixing along the length of the mixer in the direction of core material flow to the bulk flow of the core material. The larger the Peclet number, the better the plug flow. Higher Peclet numbers may result in more even coating of the core material. In one embodiment, the mixer can be operated so that the Peclet number is greater than about 6. In one embodiment the mixer is operated so that the Peclet number is greater than about 40. In one embodiment the mixer is operated so that the Peclet number is greater than about 100. A suitable counter-rotating dual-axle paddle mixer may be obtained from Hayes & Stolz, Ft. Worth Tex.

In one embodiment, the angle of the paddles in the continuous paddle mixer is adjusted so that when the kibbles are flowing through it, the Foude number is between about 0.8 and about 1.2 and the Peclet number is greater than about 6.

In one embodiment the coating may be applied to the kibble over the fluidizing zone in the continuous mixer. In one embodiment, the liquid binder may be sprayed onto the kibble above the fluidizing zone. In one embodiment, the liquid binder may be sprayed over the fluidizing zone in one or more locations along the length of the mixer. In one embodiment, the coating material may be applied to the kibble over the fluidizing zone of the continuous mixer. In one embodiment, the coating material may be applied over the fluidizing zone in one or more locations along the length of the continuous mixer. In one embodiment, the coating material may be added to the mixer with the kibble stream at the beginning of the continuous mixer.

In one embodiment, the average residence time of the core materials inside the coating unit is from about 10 to about 600 seconds. In one embodiment, the average residence time of the core materials inside the coating unit is from about 30 to about 180 seconds. When the average residence times of the core materials in the coating unit are in this range, the core materials may be coated substantially evenly, while keeping the size of the equipment compact.

In one embodiment, the flow of core materials though the unit should be from about 10 to about 60,000 kilograms per hours (kg/hr). In one embodiment, the flow of core materials though the unit should be from about 1000 to about 40,000 kg/hr.

Salmonella Deactivation Steps

Additional embodiments of the present invention include a method of making a pet food including at least one heat treating *Salmonella* deactivation step. The pet food can be in any form of embodiments of the pet food described hereinabove, and it can also include any other pet food. In one embodiment, a non-limiting example of which is a coated kibble that comprises a core and a coating as hereinabove described, two heat treating deactivation steps can be performed. The core can be formed through extruding, as described hereinabove. After extruding into a core, the core can be heat treated in a manner to sufficiently deactivate any *Salmonella* present in the core. Subsequently, prior to, or contemporaneously with, the coating can be formed and heat treated in a similar manner as that of the core to deactivate any *Salmonella* present. The coated kibble can then be formed, as described hereinabove, by coating the core with the coating.

*Salmonella* generally require the application of heat while the microbes are in a moist environment. Once completely dry, *Salmonella* can become dormant and resist efforts using dry heat to deactivate them. In a moist environment, *Salmonella* are more readily deactivated. For example, the application of heat at 80° C. for greater than about two minutes can effectively deactivate *Salmonella* when in a moist environment. Application of temperatures higher than 80° C. in moist environments results in correspondingly shorter times needed to deactivate the *Salmonella*.

Superheated steam has been used effectively in many industries to deactivate *Salmonella*. Superheated steam is defined as steam at a temperature greater than the boiling point of water for the existing pressure. Most industrial use of superheated steam utilizes pure or substantially pure steam. The non-steam component is usually air.

It has additionally been found that *Salmonella* can be effectively deactivated with humid hot air, at ambient pressure, at temperatures greater than about 80° C. One advantage of this method is that humid hot air can be injected into the fluidizing mixer at ambient pressure conditions during or after the coating step. The temperature of the humid hot air can be greater than 80° C. Higher temperatures can result in shorter times of application of humid hot air to effectively deactivate *Salmonella*. The relative humidity of the air can be greater than 50% and can even be greater than 90%. Relative humidity is defined as the ratio of the partial pressure of water vapor in the air to the saturated vapor pressure of water at a given temperature.

Thus, in one embodiment, hot air at greater than 80° C. and up to 200° C. is blown into the top of the mixer where a coated kibble has been formed. The air can be blown at about 0 to 80 CFM. Once the hot air starts blowing into the mixer, steam at a pressure of 0 to 30 PSIG and at a rate of about 0 to 4 kg/min can be injected into the mixer for 0 to about 2 minutes. The combination to hot air and steam in the mixer results in a hot air stream that can reach about 95% relative humidity. At the end of from 0 to 2 minutes, the steam can be stopped but the hot air can be continued for up to additional 8 minutes. During this period, the relative humidity inside the mixer drops, and, as it drops, moisture, or water, is removed from the surface of the kibble. At the end of the cycle of hot air, the *Salmonella* will be sufficiently deactivated.

An additional method of heat treating, or deactivating, *Salmonella* of the pet food in accordance with one embodiment of the present invention is disclosed in RU 2251364.

Vitamin Stability

It has been found that a coated kibble and processes of making thereof in accordance with embodiments of the present invention can allow for the coating of the kibble with temperature, pressure, and moisture sensitive ingredients, including all of the ingredients, sources, and components described herein. In one embodiment, the sensitive ingredients bypass the normally stressful conditions of extrusion processes and conditions as are customarily used in the art.

Additionally, it has been found that a coated kibble according to embodiments of the present invention can enhance vitamin delivery stability as well as reduce cost savings due to loss of vitamins during normal, heretofore used extrusion processes.

Embodiments of the present invention are related to providing, or delivering, sensitive ingredients. Non-limiting examples of sensitive ingredients include the other ingredients as described herein, including the active ingredients described herein, which include vitamins. Sensitive ingredients are those which are generally thought of as temperature, moisture, and pressure sensitive, such that certain conditions of temperature, moisture, and pressure can negatively impact the efficacy of the sensitive ingredient, including by increasing loss of the sensitive ingredient during processing or during storage. Thus, bypassing the normal stressful conditions of an extrusion process by being added to the core kibble after the core is extruded can be advantageous for sensitive ingredients. Thus, in one embodiment, the core kibble of any of the embodiments disclosed herein can be late-stage differentiated with sensitive ingredients, including vitamins, as described herein. Vitamins can be highly susceptible to oxidative conditions of extrusion, necessitating over formulation of vitamin pre-mix before entering the extrusion process to ensure appropriate levels of vitamins at the time of consumption by the pet. Coating the vitamins in a fluidized mixer as disclosed herein would not expose the vitamins to harsh conditions and could maintain the physical and chemical integrity of the vitamin and any stabilizers. As a result, the vitamin retention in the process increases, and the stability in storage can improve. As used herein, vitamin component includes vitamins and vitamin premixes.

Thus, one embodiment of the present invention includes a process of decreasing processing loss of vitamins of a pet food in the form of a coated kibble, such that vitamin retention can be improved. When kibbles, or cores, are extruded with vitamins, vitamin loss can be considered at its peak. Upwards of 30% to 40% of the vitamins added to the core prior to extrusion can be lost during the extrusion process. In some instances, up to 36% of vitamin A can be loss during extrusion, and about 11.2% of vitamin E can be loss during extrusion. However, in one embodiment of the present invention, the core can be extruded as described herein, wherein the core is comprised substantially free of vitamins prior to extrusion. After the core has been extruded in accordance with embodiments of the present invention, sensitive ingredients, such as any of the vitamins disclosed herein, non-limiting examples of which can be vitamin A and vitamin B, can be coated onto the extruded core, using a fluidizing mixer, non-limiting examples which are disclosed herein. The coating can be any of the coatings as described herein. In one embodiment, the coating can comprise vitamin A, vitamin E, a fat component, a palatant component, and any combinations and mixtures thereof. During the coating process, vitamin loss can also be present, however, according to embodiments of the present invention, vitamin loss can be decreased versus when the vitamin is extruded with the core. In one embodiment, vitamin loss during coating can be less than 10%. Other embodiments include vitamin processing loss of less than 9%, less than 8%, less than 7%, less than 6%, less than 5%, less than 4%, and less than 3%. In one embodiment, the vitamin loss of vitamin A can be less than 9%. In another embodiment, vitamin loss of vitamin E can be less than 4%.

Additionally, another embodiment of the present invention includes a method, or process, of improving the stability of vitamins during and after storage of a pet food in the form of a coated kibble. Thus, an embodiment of the present invention comprising a coated kibble, wherein the coating comprises a fat component and a binder component, can improve, or increase, the stability of vitamins. In one embodiment, the total retention of vitamin A, after the processing of the kibble and after 16 week storage can be at least 50%. In another embodiment, the total retention of vitamin A can be at least 55%. In another embodiment, the total retention of vitamin A can be at least 60%. In another embodiment, the total retention of vitamin A after processing of the kibble can be at least 61%.

In another embodiment, the total retention of vitamin A after processing of the kibble can be at least 61%. In another embodiment, the total retention of vitamin A after processing of the kibble can be at least 60%. In another embodiment, the total retention of vitamin A after processing of the kibble can be at least 55%. In another embodiment, the total retention of vitamin A after processing of the kibble can be at least 50%.

One embodiment can include a coating comprising a beadlet homogenized. In this embodiment, the coating can comprise a binder component and a vitamin component. The binder component can be a solution that is homogenized with the vitamin component. The mixture can be homogenized with a high sheer mixer to decrease the particle size of the beadlet in order to better adhere it to the surface of the kibble.

Another embodiment can be a coated beadlet. This embodiment can be made by spraying the binder component solution on the kibbles for about 10 seconds and then adding the vitamin component to the mixer while still spraying the binder solution over an additional 45 seconds.

Another embodiment can be a coating in the form of a powder. This embodiment can be made by adding a water soluble form of the vitamin component to the binder solution and then coating the solution over the kibbles. The powder form can comprise the vitamin component in a starch matrix.

In these embodiments, the vitamin component can be less than 1% of the coated kibble, even less than 0.5%, and even less than 0.2% of the coated kibble. The vitamin component can be a vitamin premix, which can include a carrier. In one embodiment, the vitamin component can be up to 0.3%.

Additionally, as is noted in the Examples that follow, the addition of vitamins in accordance with embodiments of the present invention results in increased animal preference. It is well known in the art that the addition of vitamins to pet food usually results in a decrease in animal preference. However, embodiments of the present invention wherein vitamins are added to a pet food results in an increase in animal preference. Thus, one embodiment of the present invention comprises a coated kibble, wherein the coating comprises vitamins, and wherein the animal preference of the coated kibble is greater than the animal preference of a kibble with vitamins that is not coated in accordance with coating embodiments of the present invention.

When describing the processing of coated kibbles in view of improving vitamin retention and stability, it should be understood that any of the processing steps, methods, and parameters as disclosed anywhere herein can be applied to the process of improving vitamin retention and stability.

Oxidation

It has been found that the stability, or lack of oxidation, of the coated kibble made in accordance with embodiments of the present invention can be increased. In one embodiment, the layering or coating as disclosed herein of the solids ingredients decreases the amount of fat ingredient of the coating that migrates, or wicks, into the core, which is where catalysts for oxidation can be present. In one embodiment, a non-limiting example of an oxidation catalyst is iron, which can be present in the core. The coating can comprise a protein component, a non-limiting example of which is chicken by-product meal, and a layer of a fat component. The protein component can decrease the amount of fat component that reaches the core and thus can reduce the amount of oxidation that occurs by way of the iron acting as an oxidative catalyst. The total aldehydes is a measure of the aldehydes that are formed in a food product. Aldehydes form as a result of food fatty acids that contain double bonds being converted to aldehydes because of their exposure to oxygen. Thus, less oxidation results in less aldehyde formation, which can mean less rancidity. Additionally, an Oxygen Bomb may be used to provide an approximate measure of length of oxidation absorbing capacity of the antioxidants in a food product. The higher the value, the longer a product is expected to be stable.

Thus, in one embodiment, a coated kibble having less aldehyde formation than other kibbles is disclosed. The coated kibble can have a coating comprising a fat component, a protein component, and a binder component. The coated kibble can have less aldehyde formation than a core without the coating. The coated kibble can have less aldehyde formation than a core having a fat component and/or palatant component, but no protein component.

Figure 2:
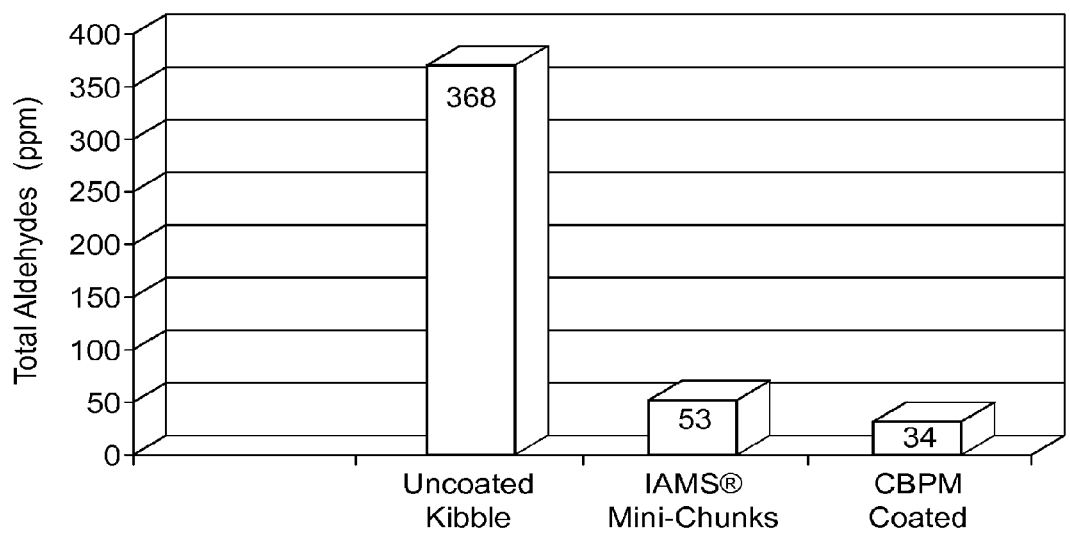
FIG. 2 shows a comparison of total aldehydes.
Figure 3:
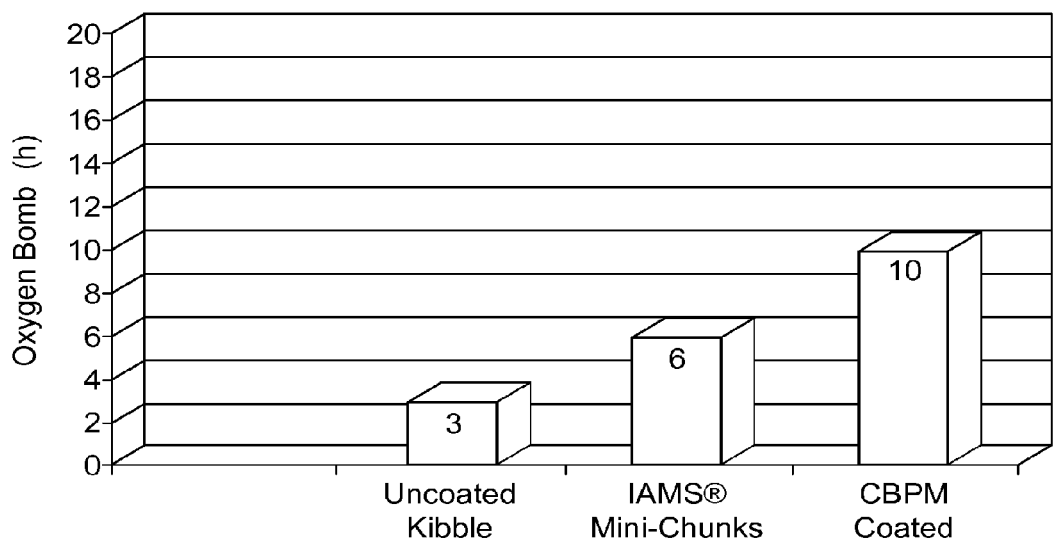
FIG. 3 shows a comparison of an oxygen bomb test.

Two comparisons are represented in FIG. 2 and FIG. 3. Uncoated Iams® Mini-Chunks core kibble can be considered oxidatively unstable as noted by the high Total Aldehydes (TA) level shown in FIG. 2. This graph illustrates the product stability benefit provided by mixed tocopherols added through the poultry fat. When Iams® Mini-Chunks current or chicken by-product meal layered kibbles are coated with an amount of fat at 5%, total aldehydes are less than 60 ppm. Comparatively, chicken meal by-product layering does not appear to result in greater total aldehydes than current Iams® Mini-Chunks. As total aldehydes increase in samples, human sensory begins to identify those samples as rancid. The oxygen bomb comparisons are shown in FIG. 3. As can be seen, the chicken meal prototype had increased oxygen bomb levels when compared to an uncoated core and an Iams® Mini-Chunks kibble. This result correlates to an increase in stability and thus shelf life of the product.

Thus, FIGS. 2 and 3 show that embodiments of the present invention, including a coated kibble having coating comprising chicken by-product meal, increases the coated kibbles oxidative stability in that total aldehydes decreases while the oxygen bomb increases.

Coated Kibble Properties

As described hereinabove, at least one advantage of the coated kibble in accordance with embodiments of the present invention includes an increase in animal preference, or pet acceptance or preference. Thus, coated kibbles according to embodiments disclosed herein are preferred by pets based on animal preference tests as described herein. Thus, as disclosed in the Examples that follow, an increase in animal preference can be present with coated kibbles in accordance with embodiments of the present invention. It is thought, without being limited by theory, that the increase in animal preference, or pet acceptance, can be explained by the following characteristics of the coated kibble, including mixtures and combinations of these. Thus, it should be understood that coated kibbles in accordance with embodiments of the present invention can include any of the following properties, all of the following properties, and any mixtures and combinations of these properties. Additionally, the coated kibbles can be nutritionally balanced, as described herein.

Wicking of Fat/Palatant

In one embodiment, a coated kibble can comprise a core and a coating wherein the coating can comprise a protein component comprising a chicken by-product meal, wherein the chicken by-product meal coating can comprise the outermost coating of the kibble, such that it is exposed to the environment and thus the animal upon eating. In one embodiment of the present invention, the increase in animal preference response (PREF), or animal acceptance or preference, can be correlated to an increase in relative fat level on the kibble surface. Animal preference response, which can be tested using a split plate test response, PREF test, includes ratio percent converted intake or ratio first bite. Without being limited by theory, it is thought that, in one embodiment, the increased animal preference response results because the protein component of the coating, such as those protein components described herein, a non-limiting example of which is chicken by-product meal, that is layered on the core prevents, or decreases, the wicking of fat components and/or palatant components that can also be part of the coating layered onto the kibble. Thus, one embodiment of the present invention relates to a method to prevent, or decrease of the amount of wicking of fat components and/or palatant components from the coating of a kibble into the core of the kibble. Additionally, the decrease or prevention of wicking of fat components and/or palatant components is thought to contribute to the improved animal preference response because more of the fat components and/or palatant components remain on the exposed surface of the kibble. Thus, one embodiment of the present invention relates to a pet food, and a method of providing a pet food, comprising an animal preference enhancing amount of fat on the kibble surface. As used herein, animal preference enhancing amount means an amount that increases the animal preference response, whether ratio percent converted intake or ratio first bite, or both of these. Additionally, while increased amounts of fat components and/or palatant components can be simply added to the exterior of pet foods, those increased amounts would modify the nutritional profile of the pet food, resulting in an unbalanced pet food. Thus, in one embodiment of the present invention, the pet food can be a balanced pet food, such as a coated kibble.

In one non-limiting example of one embodiment of the present invention, as illustrated in FIG. 1, a coated kibble 100 comprises a core 101. A first coating 102 can be layered onto core 101 as an inner coating. A second coating 103 can be layered onto first coating 102 and be an outer coating. First coating 102 can comprise a binder component and a solids component, such as a protein component, and combinations and mixtures of these. Non-limiting examples of the binder component can be as described herein and can include whey protein isolate or chicken broth. Non-limiting examples of the solids component can be as described herein and can include chicken by-product meal. Second coating 103 can comprise a fat component and a palatant component, and combinations and mixtures of these. Non-limiting examples of the fat component can be as described herein and can include chicken fat. Non-limiting examples of the palatant can be as described herein and can include chicken liver digest.

Thus, as shown in FIG. 1, the first coating 102 can act as a barrier layer to second coating 103 in that first coating 102 reduces the natural migration or wicking of the components of second coating 103 from the outer coating to the inner coating and further into the core. Thus, more of the initial amount of the second coating that was coated onto the kibble remains on the outer coating of the coated kibble. It is thought that since the first coating can comprise solid components, such as chicken by-product meal as disclosed herein, that this solid component keeps the normally moist second coating, which can comprise fat components and/or palatant components, from migrating, or wicking, from the outer coating into the inner coating and/or the core of the coated kibble.

It should be understood, however, that the binder component, solids component, fat component, palatant component, and any other components as used herein, can applied, or coated, in any order and using any coating procedure. Thus, the solids component, the binder component, the fat component, and the palatant component can be applied in any order.

Thus, in one embodiment, a coated kibble, a method of providing a coated kibble, and a process for making a coated kibble, comprising a solid barrier layer is disclosed. The solid barrier layer can be applied to a core and can comprise a protein component, which can include chicken by-product meal, and a binder component, in one non-limiting example. The outer layer can then be applied and can comprise a fat component and a palatant component. In one embodiment, the barrier layer of a solids component and a binder component can decrease the migration, or wicking, of the fat component and/or palatant component.

Aroma

Layering of a protein component, or any of the other components as described herein, as a coating on a core, as described herein, can also alter the aroma profile of a coated kibble and result in a coated kibble having different aroma profiles than typical pet food. Certain embodiments of coated kibbles as disclosed herein may contain specific compounds and components that can give the pet food desirable aromas. These compounds and components can cause changes in the aroma profile, or aroma attribute changes, which can result in improved animal preference, or animal acceptance or preference, using embodiments of a coated kibble as disclosed herein. Without being bound by theory, it is thought that these aroma attribute changes contribute to the improved preference results as detailed herein, and as shown in Tables 1, 2, and 3, of a coated kibble wherein the coating comprises a protein component, a non-limiting example such as chicken by-product meal, layered onto a kibble core. Previous consumer research has suggested that human-like aromas on pet food could be perceived as improvements in products. Examples hereinafter help to describe and show the changes in aroma profile or character that accompany non-limiting examples of embodiments of the present invention.

Thus, one non-limiting example of an embodiment of the present invention relates to a coated kibble, and a method of delivering a coated kibble, having an aroma profile, an analyte concentration, and an aroma correlation, wherein the aroma correlation relates the aroma profile comprising an analyte concentration to the increase in animal preference. Additionally, another embodiment relates to a coated kibble having an aroma profile, an analyte concentration, and thus an aroma correlation. With these embodiments, animal preference (PREF) response data, or animal acceptance or preference, can be correlated with the aroma profile and analyte concentration, as disclosed herein. Thus, in one embodiment, aroma analyte profiles and concentrations can correlate to positive, or increased, animal preference response data. Additionally, in one embodiment, the coated kibble comprises an animal preference enhancing amount of an analyte. The animal preference enhancing amount of the analyte can be within the coating, within the core, and combinations and mixtures of these. In another embodiment, a method of enhancing the animal preference of a pet food comprises delivering an animal preference enhancing amount of an analyte in a pet food is disclosed. As used herein, animal preference enhancing amount means an amount that increases the animal preference response, whether ratio percent converted intake or ratio first bite, or both of these.

The aroma profile, including analyte concentration, can be determined in accordance with the method as disclosed hereinafter, using Solid Phase MicroExtraction Gas Chromatography/Mass Spectrometry (SPME-GC-MS) to analyze pet food samples for compounds associated with the aroma. The area under the curve was measured as the SPME analysis number or count.

One embodiment of the present invention relates to a coated kibble and a method of delivery thereof wherein the coated kibble has a particular aroma profile. A non-limiting example of a coated kibble comprises a core comprising a carbohydrate source, a protein source, a fat source, and other ingredients, all as disclosed herein, and a coating comprising a protein component, a binder component, a palatant component, a fat component, and other components. In this embodiment, an aroma profile of the coated kibble can be generated and analyzed showing the effect of specific analyte concentrations on the aroma. Concentrations can be determined for each of the analytes. The concentration of the analytes can then be correlated with PREF response data that was gathered for each of the embodiments to show an aroma correlation with the PREF response data. Thus, in one embodiment, an increase in particular analytes present in the aroma can drive up, or increase the PREF response data, meaning a greater PREF response, resulting in higher animal preference or acceptance.

In one embodiment, the analytes 2-piperidione, 2,3-pentanedione, 2-ethyl-3,5-dimethypyrazine, furfural, sulfurol, indole, and mixtures and combinations of these, can be elevated or representative of families with elevated levels when compared to off the shelf pet food. Thus, in one embodiment, a coated kibble comprising particular concentrations of the analytes 2-piperidione, 2,3-pentanedione, 2-ethyl-3,5-dimethypyrazine, furfural, sulfurol, indole, and mixtures and combinations of these, increases PREF response. Thus, an animal preference enhancing amount of the analytes 2-piperidione, 2,3-pentanedione, 2-ethyl-3,5-dimethypyrazine, furfural, sulfurol, indole, and mixtures and combinations of these, can be present in one embodiment of the coated kibble. This animal preference enhancing amount of the analytes can increase the PREF response. In one embodiment, the Ratio Percent Converted Intake (PCI) can increase with an animal preference enhancing amount of the analytes 2-piperidione, 2,3-pentanedione, 2-ethyl-3,5-dimethypyrazine, furfural, sulfurol, indole, and mixtures and combinations of these. In another embodiment, the Ratio First Bite can increase with an animal preference enhancing amount of the analytes 2-piperidione, 2,3-pentanedione, 2-ethyl-3,5-dimethypyrazine, furfural, sulfurol, indole, and mixtures and combinations of these.

Thus, one embodiment of the present invention relates to a coated kibble comprising an enriched amount, or an animal preference enhancing amount, of the analytes 2-piperidione, 2,3-pentanedione, 2-ethyl-3,5-dimethypyrazine, furfural, sulfurol, indole, and mixtures and combinations of these. Another embodiment includes a method of delivering a coated kibble comprising an animal preference enhancing amount of the analytes 2-piperidione, 2,3-pentanedione, 2-ethyl-3,5-dimethypyrazine, furfural, sulfurol, indole, and mixtures and combinations of these.

Another embodiment of the present invention relates to a method of enhancing the animal preference of a pet food comprising delivering an animal preference enhancing amount of an analyte in a pet food. The method can include providing a pet food, as disclosed herein, wherein the pet food comprises enriched amount, or an animal preference enhancing amount, of the analytes 2-piperidione, 2,3-pentanedione, 2-ethyl-3,5-dimethypyrazine, furfural, sulfurol, indole, and mixtures and combinations of these. The method can also comprise adding to pet food animal preference enhancing amounts of the analytes 2-Piperidione, 2,3 pentanedione, 2-ethyl-3,5-dimethypyrazine, furfural, sulfurol, indole, and mixtures and combinations of these.

In one embodiment, the analyte 2-piperidione can have a SPME analysis number of greater than 1,500,000, or less than 10,000,000, or between 1,500,000 and 10,000,000, and all integer values less than, greater than, and therebetween those values. In one embodiment, the analyte 2,3-pentanedione can have a SPME analysis number of greater than 65,000, or less than 500,000, or between 65,000 and 500,000, and all integer values less than, greater than, and therebetween those values. In one embodiment, the analyte 2-ethyl-3,5-dimethypyrazine can have a SPME analysis number of greater than 310,000, or less than 1,000,000, or between 310,000 and 1,000,000, and all integer values less than, greater than, and therebetween those values. In one embodiment, the analyte furfural can have a SPME analysis number of greater than 2,300,000, or less than 7,000,000, or between 2,300,000 and 7,000,000, and all values less than, greater than, and therebetween those values. In one embodiment, the analyte sulfurol can have a SPME analysis number of greater than 150,000, or less than 1,000,000, or between 150,000 and 1,000,000, and all values less than, greater than, and therebetween those values. In one embodiment, the analyte indole can have a SPME analysis number of greater than 176,000, or less than 2,000,000, or between 176,000 and 2,000,000, and all values less than, greater than, and therebetween those values. In another embodiment, the coated kibble can comprise mixtures and combinations of these analyte SPME analysis numbers, including just one of these.

As described herein, an animal preference enhancing amount of these analytes, either alone or in a combination or mixture, can increase the animal preference response, whether ratio percent converted intake or ratio first bite, or both of these. For example, Example 3 hereinafter shows just two non-limiting examples of the present invention, namely a first prototype of a chicken by-product meal layered kibble made by enrobing a formula re-balanced Iams® Mini-Chunks core kibble with 10% chicken by-product meal and 5% chicken broth (20% chicken broth solution), all by weight of the kibble, with a palatant system of 1% chicken liver digest and 2% chicken viscera digest added along with 5% fat, and second prototype made similarly to the first prototype with the exception that it utilized a different binder, 5% whey protein isolate (20% whey protein isolate solution), and did not include any chicken viscera digest. As shown in Table 3, with Test 1 for the first prototype and Test 2 for the second prototype, the percent converted intake and the first bite are both at ratios consistent with an increase of animal preference response. Specifically for the first prototype, a percent converted intake ratio of 16.5:1 and an infinite first bite were present. Specifically for the second prototype, a percent converted intake ratio of 16.2:1 and 31:1 first bite were present. Thus, an animal preference enhancing amount of one, all, or a mixture or combination of the analytes can be present and is evidenced by these increase animal preference responses.

Figure 4:
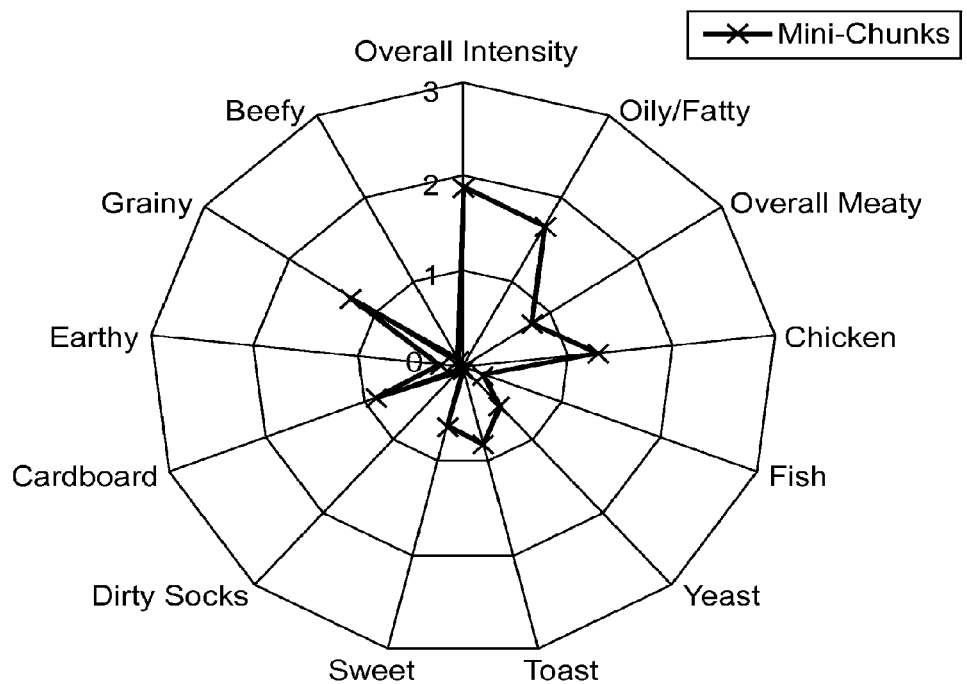
FIG. 4 provides the results of an aroma characterization.
Figure 5:
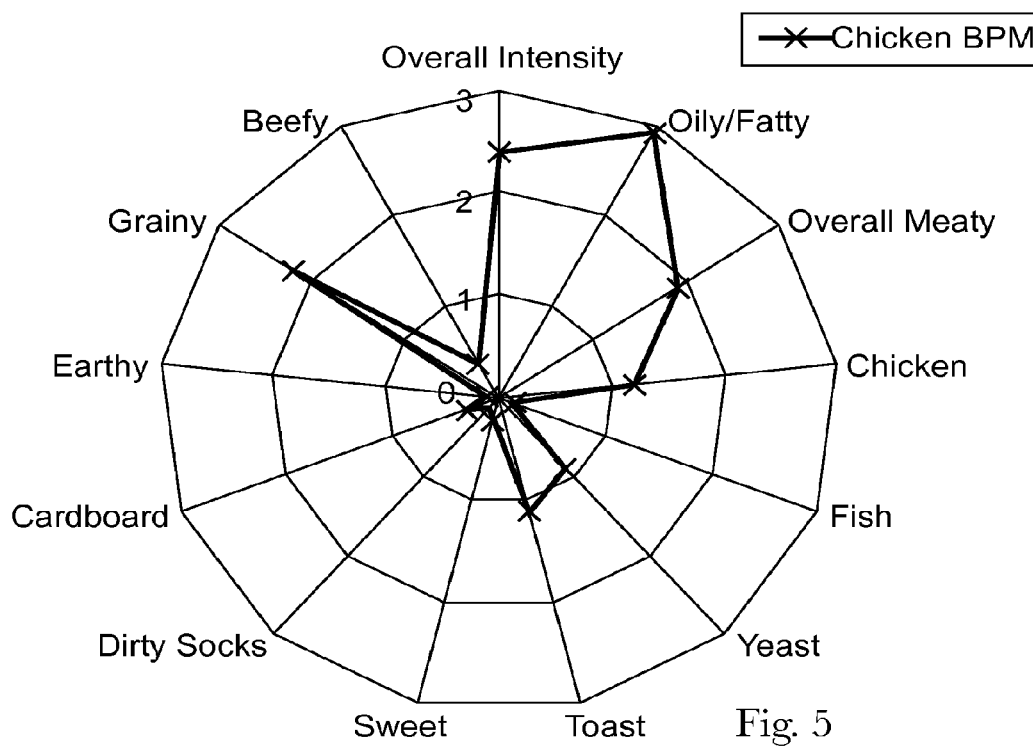
FIG. 5 provides the results of an aroma characterization.
Figure 6:
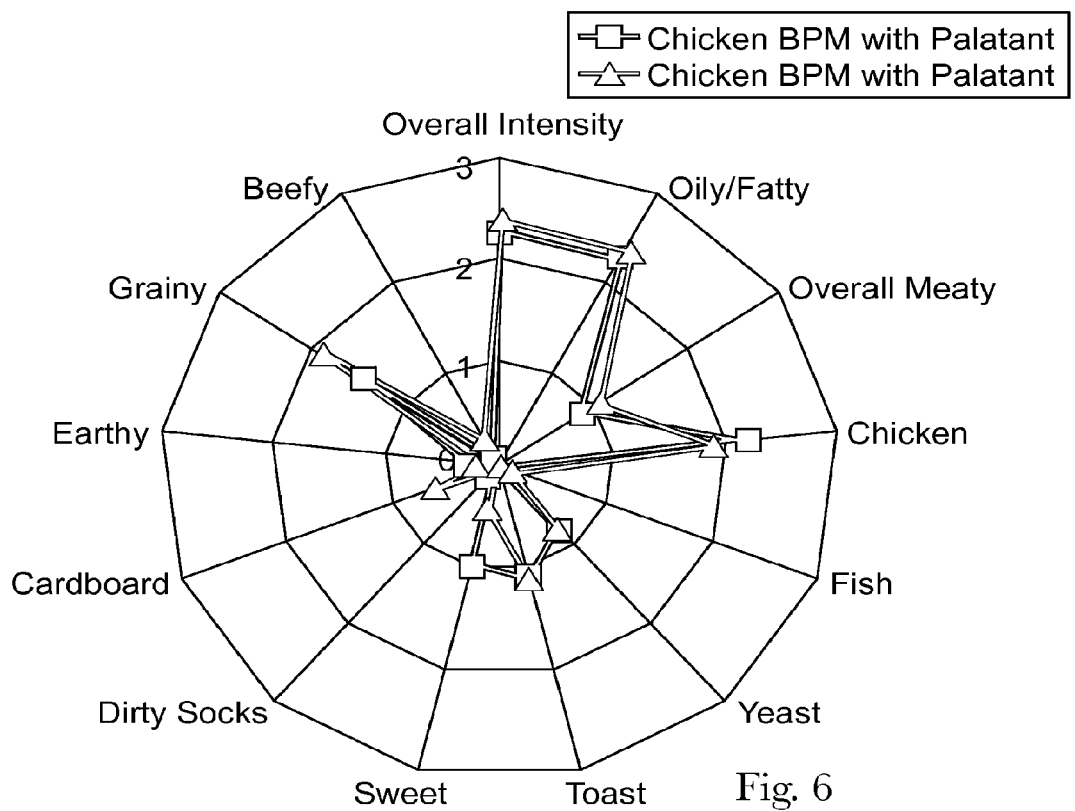
FIG. 6 provides the results of an aroma characterization.

Additionally, and as described hereinafter in Example 4 and as shown in FIGS. 4 through 6, consumer data illustrates aroma profile differences between non-limiting embodiments of the present invention and commercial pet food that is not enriched with the aroma analytes as described herein. FIG. 4 shows the panel's aroma characterization for Iams® Mini-Chunks. As can be seen, Mini-Chunks is reduced in Overall Intensity, Yeast, and Dirty Socks aroma character. FIG. 5 shows the chicken by-product meal protein layering prototype of Example 2 with no additional palatant. The chicken by-product meal protein layering prototype results in increased Oily/Fatty and Overall Meaty character. FIG. 6 shows the chicken by-product meal layering prototypes with the addition of palatant(s) of Example 3, Tests 1 and 2. The chicken by-product meal protein layering prototype results in increased Oily/Fatty character but had a similar Overall Meaty character. Chicken character was also elevated for the chicken by-product meal layering prototype with additional palatant.

Additionally, consumer research has suggested that certain aromas on pet food could be perceived as improvements in pet food products, such as kibbles, from a human perspective. Thus, non-limiting examples of embodiments of the present invention provide an aroma profile that provides certain increased and decreased aroma attributes perceived by humans. Aroma attributes can include the following: overall intensity, oily/fatty, overall meaty, chicken, fish, yeast, toast, sweet, dirty socks, cardboard, earthy, grainy, and beefy. In some embodiments it can be desired that certain of these aroma attributes are at increased, or higher, levels while certain of these attributes are at decreased, or lower, levels. Thus, in one embodiment of the present invention, a pet food in accordance with any of the embodiments described herein is provided such that an aroma profile is provided by the pet food that is perceptible to humans, wherein the aroma profile can be described using human sensory aroma attributes. Embodiments of the human sensory attributes include elevated levels of oily/fatty aroma, elevated levels of overall intensity, elevated levels of overall meaty aroma, decreased levels of cardboard aroma, decreased levels of dirty socks aroma, and combinations and mixtures of these.

EXAMPLES

Example 1

Animal Preference

Test #1: Kenneled dogs were tested using the following kibbles. A kibbled dog food was made as a test kibble prototype using the core of Iams® Mini-Chunks. The core was coated with a layer of 0.5% chicken liver digest, 2% fat, 10% chicken by-product meal, and 5% chicken broth (as a binder, 20% chicken broth solution), all by weight of the kibble. A control prototype was made using the core of Iams® Mini-Chunks and coated with 0.5% chicken liver digest and 2% fat, all by weight of the kibble.

Test #2: In-home pet dogs were tested using the following kibbles. A test kibble prototype was made using the core of Iams® Mini-Chunks. The core was coated with a layer of 0.5% chicken liver digest, 2% fat, 10% chicken by-product meal, 5% chicken broth (as a binder, 20% chicken broth solution), all by weight of the kibble, and was coated with a 0.13% vitamin pre-mix to determine whether externally coating vitamins on a core having a protein layer would negatively impact animal preference of the kibble. A control prototype was made using Iams® Mini-Chunks as a core and coated with 0.5% chicken liver digest and 2% fat, all by weight of the kibble.

Both tests included a *Salmonella* inactivation step of adding 4% moisture, or water, to the chicken by-product meal layer then drying the product for three minutes at 260° F.

Test #1 resulted in the chicken by-product meal layered prototype being overwhelming preferred by dogs (41:1 total volume; 50:1 Percent Converted Intake (PCI); See Table 1 below). Moreover, over 98% of the total food consumed during the two day split plate test was the chicken by-product meal layered prototype. Test #2 resulted in the chicken by-product meal layered prototype being preferred by in-home dogs (4.5:1 total volume; 4.4:1 PCI). To put these results into perspective, before dogs (or cats) are allowed to be on an animal preference panel, they undergo qualifying PREF tests. One of the qualifying tests typically is an obvious choice (known positive control versus a known negative control). The positive control typically is made with the normal commercial palatant, such as chicken liver digest, coated onto it. The negative control is made without a palatant. A previous "obvious choice" test with the kenneled dogs resulted in 16:1 total volume; 14:1 PCI. A previous "obvious choice" test with in home dogs resulted in a 2.2:1 total volume; 2.4:1 PCI. In neither case, kenneled or in home pets, did the obvious choice test result in as strong of a preference as occurred with the chicken by-product meal layered prototypes.

TABLE 1

Summary Results of Preference Tests Compared to Reference Tests

| Results | Test 1 Test (Chicken by-product meal Layered Prototype) vs. Control | Test 2 Test (Chicken by-product meal Layered Prototype) vs. Control | Reference Test 1 Test (Kenneled Dogs Obvious choice-with Palatant) vs. Control | Reference Test 2 Test (In Home Pets Obvious choice-with Palatant) vs. Control |
|---|---|---|---|---|
| Total Volume (g/Day) | 41.4:1 * | 4.5:1* | 15.6:1* | 2.2:1** |
| Percent Converted Food Intake (%/Animal/Day) | 49.6:1 * | 4.4:1* | 13.5:1* | 2.4:1** |
| First Bite | ∞[1] | 7.25:1 | 4.4:1 | 3:1 |
| Preference Segmentation[2] | 16/0/0 | 18/7/1 | 15/0/0 | 18/7/3 |

*P < 0.02
**P < 0.05
[1] ∞ = infinity; No dogs ate the Control prototype first so the divisor was zero.
[2] Preference Segmentation = number of dogs preferring Test prototype/number of dogs showing no preference/number of dogs preferring Control prototype Example 2

Animal Preference

A chicken by-product meal layered kibble prototype was made by layering, or enrobing, the core of Iams® Mini-Chunks with 10% chicken by-product meal and 5% chicken broth (20% chicken broth solution), all by weight of the kibble. No palatant was added. A 5% coating of fat, by weight of the kibble, was also added. This prototype was compared with Iams® Mini-Chunks and Purina ONE® (Total Nutrition Chicken and Rice) in split plate, or animal preference, tests. All split plate tests were conducted by standard methods using kenneled dogs. A *Salmonella* inactivation step of adding 4% moisture, or water, to the chicken by-product meal layer then drying the product for three minutes at 260° F. was performed.

The layered prototype was preferred (P<0.05) over Iams® Mini-Chunks (8:1 Percent Converted Intake (PCI); See Table 2). The layered prototype was also preferred (P<0.05) over Purina ONE® (3:1 PCI).

TABLE 2

Summary Results of Preference Tests Compared to Reference Tests

| Results | Test (Chicken by-product meal Layered Prototype) vs. Iams ® MiniChunks | Test (Chicken by-product meal Layered Prototype) vs. Purina ONE ® |
|---|---|---|
| Total Volume (g/Day) | 7.1:1* | 4.9:1** |
| Percent Converted Food Intake (%/Animal/Day) | 8.2:1* | 3.3:1* |
| First Bite | 1.7:1 | 2.9:1 |
| Preference Segmentation[1] | 14/2/0 | 12/3/1 |

*P < 0.05
**P < 0.10
[1]Preference Segmentation = number of dogs preferring Test prototype/number of dogs showing no preference/number of dogs preferring Control prototype Example 3

Animal Preference

A chicken by-product meal layered kibble first prototype was made by enrobing a formula re-balanced Iams® Mini-Chunks core kibble with 10% chicken by-product meal and 5% chicken broth (20% chicken broth solution), all by weight of the kibble, in a 32-liter pilot Bella mixer. A palatant system of 1% chicken liver digest and 2% chicken viscera digest was added as an additional coating to this prototype along with 5% fat, by weight of the kibble. In sum, this prototype was reformulated to have similar nutrient composition as Iams® Mini-Chunks. A second prototype was made similarly to this one with the exception that it used a different binder, 5% whey protein isolate (20% whey protein isolate solution), and did not include any chicken viscera digest. These prototypes were compared to Purina ONE® (Total Nutrition Chicken & Rice) in preference tests. Another comparison included comparing a third prototype, which is the first prototype of 10% chicken by-product meal layering using chicken broth as a binder on an Iams® Mini-Chunks extruded core but not rebalanced, to Iams® Mini-Chunks. Also included was this same third prototype without including the chicken by-product meal and again comparing to Iams® Mini-Chunks. All preference tests were two days in length and performed with standard methods using kenneled dogs (n=16). The process of making the prototypes with a layer of chicken by-product meal included a *Salmonella* inactivation step of adding 4% moisture, or water, to the chicken by-product meal layer then drying the product for three minutes at 260° F.

The chicken by-product meal layered re-balanced Iams® Mini-Chunks prototypes (using broth or whey protein isolate) were substantially preferred (P<0.05) over Purina ONE® (17:1 and 16:1 Percent Converted Intake (PCI); See Table 3). The chicken by-product meal layered prototype (not re-balanced) using broth as a binder was also preferred (P<0.05) over Iams® Mini-Chunks (8:1 PCI), whereas broth alone (no chicken by-product meal) did not result in as great of an animal preference boost (2:1, P<0.10). At least three primary conclusions can be drawn: 1) 10% chicken by-product meal layering in combination with the existing animal preference system overwhelmingly beat Purina ONE®, 2) the positive impact of 10% chicken by-product meal layering is maintained as the product is re-balanced for protein (i.e., the level of protein is reduced in the core kibble) and 3) the impact of 10% chicken by-product meal layering is independent of the influence of the binder on animal preference.

TABLE 3

Summary Results of Preference Tests Compared to Reference Tests

|  | Test 1 Results 10% Chicken by-product meal Layered Re-Balanced Iams ® Mini-Chunks-broth binder vs. Purina ONE ® | Test 2 10% Chicken by-product meal Layered Re-Balanced Iams ® Mini-Chunks-whey protein isolate binder vs. Purina ONE ® | Test 3 10% Chicken by-product meal Layered Iams ® Mini-Chunks (not rebalanced)-broth binder vs. Iams ® Mini-Chunks | Test 4 Iams ® Mini-Chunks (not rebalanced)-broth binder only vs. Iams ® Mini-Chunks |
|---|---|---|---|---|
| Total Volume (g/Day) | 16.6:1* | 15.1:1* | 7.1:1** | 2.4.1:1*** |
| Percent Converted Food Intake (%/Animal/Day) | 16.5:1** | 16.2:1** | 8.2:1** | 2.3:1**** |
| First Bite | ∞[1] | 31:1 | 1.7:1 | 1.1:1 |
| Preference Segmentation[2] | 16/0/0 | 16/0/0 | 14/2/0 | 9/4/3 |

*P < 0.02
**P < 0.05
***NS (P > 0.10)
****P < 0.10
[1]∞ = infinity; No dogs ate the Control prototype first so the divisor was zero.
[2]Preference Segmentation = number of dogs preferring Test prototype/number of dogs showing no preference/number of dogs preferring Control prototype

Example 4

Human Sensory

A human sensory descriptive panel of nine was used to assess aroma attributes of dog food. The dog food was evaluated for aroma using 13 descriptive attributes and rated on a 0 to 8 point scale.

FIG. 4 shows the panel's aroma characterization for Iams® Mini-Chunks. As can be seen, Mini-Chunks is reduced in Overall Intensity, Yeast, and Dirty Socks aroma character. FIG. 5 shows the chicken by-product meal protein layering prototype of Example 2 with no additional palatant. The chicken by-product meal protein layering prototype results in increased Oily/Fatty and Overall Meaty character versus other off the shelf dog kibble foods. FIG. 6 shows chicken by-product meal layering prototypes with the addition of palatant(s) of Example 3, Tests 1 and 2. The chicken by-product meal protein layering prototype results in increased Oily/Fatty character but had a similar Overall Meaty character versus other off the shelf dog kibble foods. Chicken character was also elevated for the chicken by-product meal layering prototype with additional palatant.

Example 5

Process

About 6000 g of core kibbles of an extruded and dried mixture of ground corn, chicken by-product meal, minerals, vitamins, amino acids, fish oil, water, and beet pulp are introduced into a paddle mixer in a hopper located above the paddle mixer. The mixer is a model FZM-0.7 Forberg fluidized zone 20-liter mixer manufactured by Eirich Machines, Inc., Gurnee, Ill., USA. The binder component is composed of about 70 grams of whey protein isolate (Fonterra NMZP) mixed with about 300 grams of warm (60° C.) water to make a solution. Once the kibbles have been added to the mixer, the paddles are rotated to fluidize the kibbles. The paddles are rotated at about 84 RPM and the Froude number is about 0.95. The whey protein solution is pumped to the spray valve over the fluidized zone in the center of the mixer using Cole-Parmer model 07550-30 peristaltic pump using a parallel Masterflex US Easyload II pump head. The whey protein solution is sprayed over the fluidized zone of the mixer over a period of about 60 seconds. About 750 grams of chicken by-product meal as a protein component is split into two 375 gram portions, and each portion is added in separate corners down the sides of the mixer over period of about 60 second simultaneously with the whey protein addition. A coated kibble is then formed. The doors at the bottom of the mixer are opened to dump the coated kibbles into a metal receiver. The coated kibbles are then dried in an air impingement oven at about 140° C. for about 2 minutes. Visual examination of the kibbles shows that the mixture has been substantially evenly coated over the surface of the kibbles to form a solid layer. Slicing several of the kibbles in half confirms that the distribution of the coating around the surface of the individual kibbles is substantially even. During the operation of the mixer in this example, the Froude number was about 0.95, the dimensionless flux was about 0.000262, and the convective cycle time was about 10 seconds.

Example 6

Process/*Salmonella*

A 200-liter (7 cu. ft.) double axle fluidizing mixer manufactured by Eirich Machines, Inc., model FZM 7 is used in this example. Steam is connected to two ports on opposite corners of FZM 7 mixer. A hot air blower is connected to the mixer to blow in hot air into the top of the mixer. About 60 kg of dry (about 7.5% moisture, or water) pet food cores, or core pellets, are added to the mixer. In a separate container, about 600 grams of whey protein isolate (Fonterra NMZP) binder is mixed with about 2400 grams of warm (60° C.) water to make a binder solution. Four containers are each filled with about 1.5 kg of chicken by-product meal (6 kg chicken by-product meal total) as protein. The chicken by-product meal tests positive for *Salmonella*. This binder solution is transferred to a pressure canister, and a spray nozzle line is connected between the canister and the spray valve that is centered over the fluidized zone of the mixer. Two spray nozzles, each having a flat spray profile with an angle of about 45 degrees, are present. The two nozzles are positioned over the center of the fluidized zone along the axis of the paddles, one about half way between one side wall and the center of the mixer, and the second about half way between the center and the opposite side of the mixer. The mixer is preheated with hot air to about 60° C. The mixer is started at about 55 RPM. The canister containing the binder is pressurized to about 30 psi, and binder spray is initiated into the mixer. At the same time the four containers each holding about 1.5 kg of chicken by-product meal are added to the mixer at four different points: two containers are added at opposite corners of the mixer, and two containers are added at the center of the mixer, on opposite sides. The binder and the chicken by-product meal are added to the mixer over a period of about 45 seconds. After the completion of the addition of the binder and the chicken by-product meal, while the mixer is still rotating, hot air (about 200° C.) is then blown into the top of the mixer at about 40 CFM. Once the hot air starts blowing into the mixer, about 15 psig steam at a rate of about 2 kg/min is injected into the mixer through two steam nozzles on opposite sides of the mixer for about one minute. The combination to hot air and steam in the mixer results in a hot air stream of about 95% relative humidity. At the end of one minute, the steam is stopped but the hot air is continued for an additional four minutes. During this period, the relative humidity inside the mixer drops, and, as it drops, moisture, or water, is removed from the surface of the kibble. At the end of the two minutes of hot air, doors at the bottom of the mixer are opened and the kibbles are dropped into a container. Visual examination of the kibbles shows that the mixture has been substantially evenly coated over the surface of the kibbles to form a solid layer. Slicing several of the kibbles in half confirms that the distribution of the coating around the surface of the individual kibbles is substantially even. During the operation of the mixer in this example, the Froude number was about 0.95, the dimensionless flux was about 0.000261, and the convective cycle time was about eight seconds. These are substantially the same conditions of Froude number, dimensionless flux, and convective cycle time as for Example 5. Since the finished product was substantially the same in the larger mixer as in the smaller mixer under the same scale up conditions, the scale up criteria can be considered validated. A test for *Salmonella* on the finished coated kibbles is negative.

Example 7A

Vitamin Stability

To demonstrate the improved vitamin retention by way of a coating applied using a fluidized mixer, a comparison between the process loss and the loss in storage of coated vitamins versus extruded vitamins can be analyzed. To compare the process loss, current Iams® Mini-chunks were extruded with and without vitamins. The product with vitamins was enrobed with a coating of 5% poultry fat mixed with 1.6% chicken livers digest and 0.14% vitamin premix. The product without vitamins was enrobed in a fluidizing mixer with a 5% poultry fat coating and a 1.6% chicken livers digest palatant coating. Samples of all the inputs and outputs of the process were collected and analyzed for vitamin A and vitamin E.

Based on the mass balance around the fluidizing mixer, the coating process had 8.2% vitamin A loss and 3.3% vitamin E loss. The extruder reduced vitamin A by 36% and reduced vitamin E by 11.2%. See Table 4.

TABLE 4

Process Loss of Vitamin A and E in Coating and Extrusion

| Nutrient | % Loss in Coating | % Loss in Extruder |
|---|---|---|
| Vitamin A | 8.2 | 36.0 |
| Vitamin E | 3.3 | 11.2 |

To compare the loss in storage, vitamin coated products and extruded vitamin products were bagged and sealed into 13 multi-wall paper bags. The bags were stored in accelerated conditions (100° F. and 50% relative humidity) and ambient conditions (70° F. and 25% relative humidity). Two more prototypes were evaluated in the storage stability testing including one as Iams® Mini-Chunks with one layer of Paramount B from Loders Croklaan (partially hydrogenated palm kernel oil) and a second layer of vitamins, fat, and palatant, and the second as Iams® Mini-Chunks with 5% chicken broth and 10% chicken byproduct meal mixed with vitamins as the coating. The two products were sealed and stored in both accelerated and ambient conditions as above.

Figure 7:
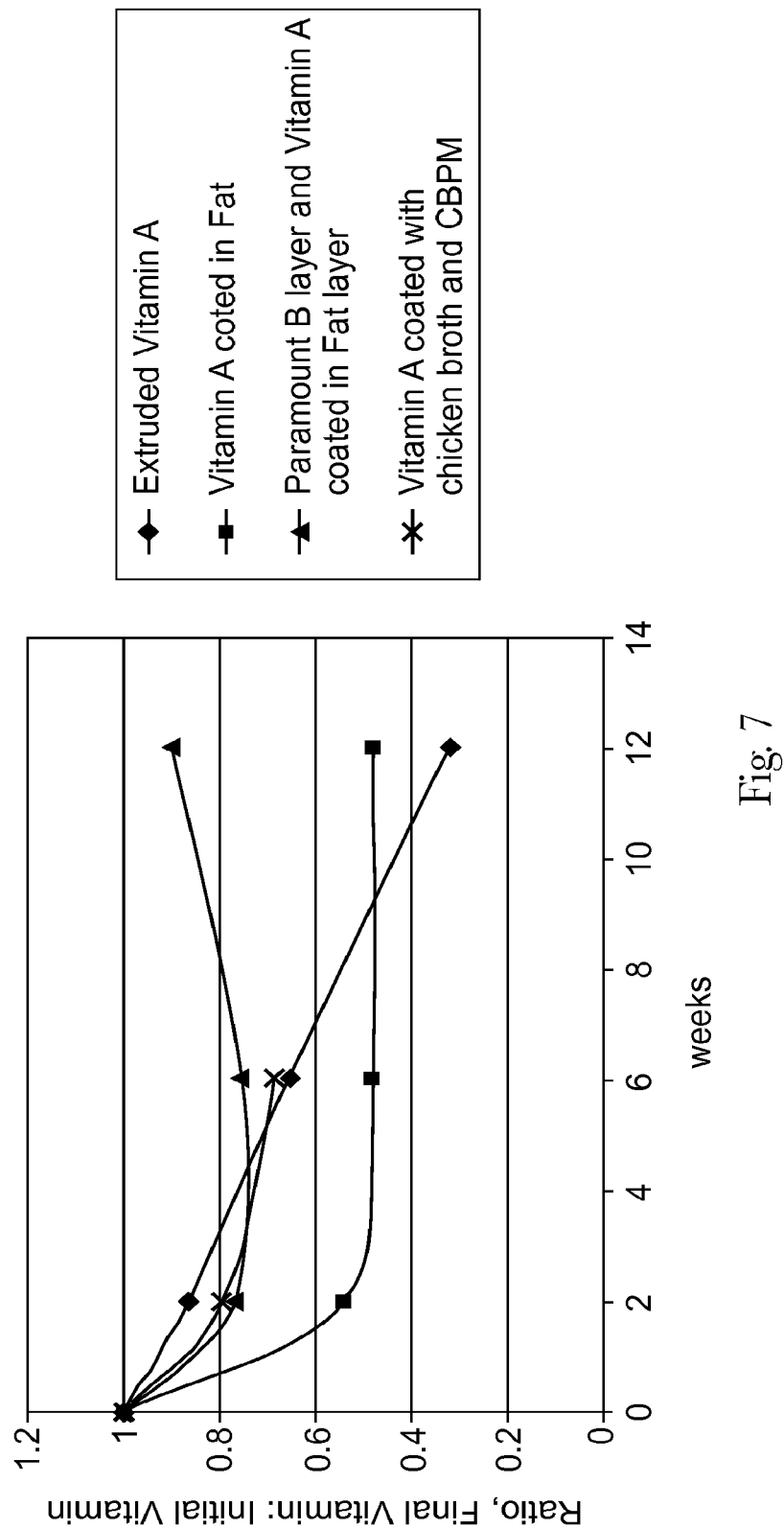
FIG. 7 provides the results of a vitamin loss comparison.
Figure 8:
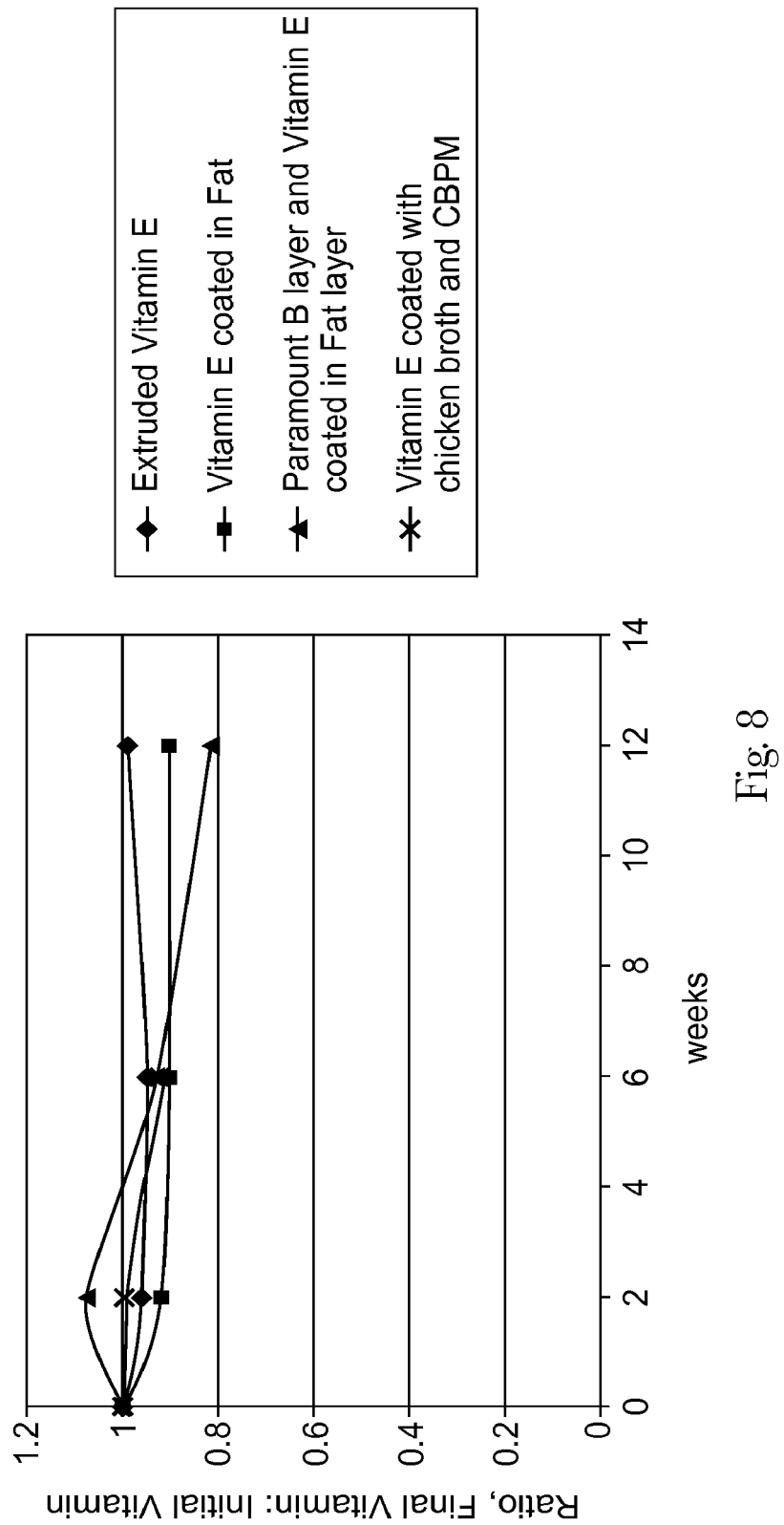
FIG. 8 provides the results of a vitamin loss comparison.

The products held in storage were sampled and analyzed for vitamin A and E. The results were normalized because the level at time zero was not consistent for all the products. FIGS. 7 and 8 show the results. FIG. 7 shows the time in weeks on the x-axis and the ratio of the final vitamin amount to the initial vitamin amount on the y-axis. Overall, the vitamin coatings maintained greater vitamin A stability than the extruded vitamin control. The vitamins in the chicken fat showed a large drop in vitamin A levels after the first two weeks but rapidly became stable. It was hypothesized and later verified with benchtop testing that the chicken fat does not have the binding capability to adhere the rice hulls in the vitamin premix because the particle size is too large. This issue can be resolved using a stronger binder, which is demonstrated by the improved vitamin A stability using Paramount B and chicken broth as binders.

Example 7B

Vitamin A Stability

Four additional kibbles were compared. The coated kibbles compared all used a rebalanced Iams® Mini-Chunks core. The four coatings were: 1) beadlet homogenized, which is a kibble coated with a whey protein isolate solution homogenized with vitamin A crosslinked with a gelatin (the standard crosslinked form of vitamin A from BASF and DSM). The mixture was homogenized with a high sheer mixer to decrease the particle size of the beadlet in order to better adhere it to the surface of the kibble. 2) Coated beadlet, which is a kibble coated by spraying whey protein isolate solution on the kibbles for 10 seconds, then adding the crosslinked vitamin A dry to the mixer while still spraying the binder solution over an additional 45 seconds. 3) Powder A, which is a kibble coated by adding a water soluble form of vitamin A to the whey protein isolate solution then coating the solution over the kibbles. The powder form is vitamin A in a starch matrix. 4) An extruded kibble with vitamin A mixed with the core prior to extrusion. All of the kibbles used vitamins that were coated at 0.13% by weight of the formula.

The result of the process loss and storage loss of Vitamin A are shown in Table 5. The storage loss procedure performed was that as described in Example 7A.

TABLE 5

Process and Storage Loss of Vitamin A

| | % Loss In Process | % Loss in Storage | % Total Loss | % Total Retention |
|---|---|---|---|---|
| Extruded Vitamin A in Premix | 37 | 72 | 60 | 40 |
| Beadlet Homogen in WPI | 28 | 35 | 43 | 57 |
| Beadlet coated with WPI | 5 | 49 | 39 | 61 |
| Powder A with WPI | 11 | 65 | 45 | 55 |

Example 8

Aroma Analysis

In this Example, 19 studies of different kibble prototypes were conducted analyzing the aroma of a coated kibble. This method uses Solid Phase MicroExtraction Gas Chromatography/Mass Spectrometry (SPME-GC-MS) to analyze pet food samples for compounds associated with aroma (as described hereinafter). Additionally, the degree of correlation between the SPME data and the animal preference (PREF) was studied to determine which formula components correlate to the highest, or best, PREF.

The 39 SPME analytes were grouped into one of 19 aromatic compound families along with the corresponding correlation with Split Plate analysis of Ratio Percent Converted Intake and First Bite. The SPME results from the current Iams® Mini-Chunks and the first prototype and second prototype of Example 3 were then compared to identify analytes that differed in the lead Test Prototypes. Results indicate that the analytes 2-Piperidione, 2,3-pentanedione, 2-ethyl-3,5-dimethypyrazine, furfural, sulfurol, and indole were all elevated or representative of families with elevated levels compared to current Iams® Mini-Chunks. These compounds also were significantly ($P<0.01$) correlated ($R^2>0.60$) with improved animal preference response by dogs, as shown in Table 6.

TABLE 6

Aromatic Compounds and Dog Preference

| Aromatic Compound | Correlation | P-Value |
|---|---|---|
| 2-Piperidinone | 0.72 | 0.00055342 |
| 2,3-pentanedione | 0.76 | 0.00010555 |
| 2-ethyl-3,5-dimethylpyrazine | 0.70 | 0.00052086 |
| Furfural | 0.68 | 0.00097682 |
| Sulfurol | 0.69 | 0.00082698 |
| Indole | 0.62 | 0.00356432 |

Example 9

Continuous Fluidizing Paddle Mixer

Brown kibbles are fed continuously into a continuous fluidizing paddle mixer manufactured by Hayes & Stolz (Ft. Worth, Tex., USA) from a feed hopper elevated above the mixer. The mixer is filled to the center line of the axles with kibbles, and the speed of the paddles is adjusted to give good fluidization of the kibbles and a residence time in the mixer of about 45 seconds. The Froude number is approximately 0.95. The flow rate of kibbles through the mixer is about 40 kg/min. Once steady state flow is established in the mixer, a 1-liter sample of white-colored kibbles is added into the entrance of the mixer. In an ideal mixer, the white kibbles would go through the mixer in a coherent slug, and they would all exit the mixer at the same time. In a real mixer the kibbles get bounced around both forward and backward as they move through the mixer, so they come out as a distribution around a mean residence time. In order to measure this distribution, approximately 500 gram samples of white kibbles are collected every 5 seconds at the exit of the mixer, starting when the 1-liter sample of white kibbles is added to the entrance of the mixer. The percentage of white kibbles in each sample by weight is measured. Using the mathematical methods outlined in Levenspiel, "Chemical Reaction Engineering," the residence time distributions are calculated.

| Sample | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Time (t) after 1 liter of white kibbles is added to the entrance of the mixer (seconds) | 0 | 5 | 10 | 15 | 20 | 25 | 30 | 35 | 40 | 45 | 50 | 55 | 60 | 65 |
| Mass of white kibbles in the sample at the exit (grams) | 0 | 0 | 0 | 0 | 0 | 0 | 64 | 873 | 1159 | 444 | 60 | 9 | 1 | 0 |
| Total mass of kibbles in the sample at the exit (grams) | | | 3197 | 3312 | 3314 | 3450 | 3066 | 3249 | 3613 | 3473 | 3044 | 3310 | 3786 | 3240 |
| t* mass white kibbles | 0 | 0 | 0 | 0 | 0 | 0 | 1920 | 30555 | 46360 | 19980 | 3000 | 495 | 60 | 0 |
| t2 * mass white kibbles | 0 | 0 | 0 | 0 | 0 | 0 | 57600 | 1069425 | 1854400 | 899100 | 150000 | 27225 | 3600 | 0 |

$$\text{mean } t = \frac{\Sigma t_i C_i \Delta t}{\Sigma C_i \Delta t} = 39.22222 \text{ sec}$$

$$\sigma^2 = \frac{\Sigma t_i^2 C_i \Delta t}{\Sigma C_i \Delta t} - (\text{mean } t)^2 = 17.69008 \text{ sec}^2$$

Dimensionless $\sigma^2$ = 0.011499

Dimensionless $\sigma^2$ = 2 (D/uL) − 2 (D/uL)$^2$ (1 − e − (uL/D))

D/uL = 0.005775

Peclet # = 173.1585

Flowrate = 40.20764 kg/min

A Peclet number greater than about 6 is considered approximately plug flow. A Peclet number above about 100 is considered good plug flow.

Example 10

This example relates to reducing the surface energy using an emulsifier, which can result in better adhesion of the coating to the surface of the kibble. Two preparations for a Probiotic powder, including its constituents, are made. Both powders are identical except that Powder A contains probiotic and 0.1% polysorbate 80, and powder B contains probiotic and 0.5% polysorbate 80. The surface energies of the powders are measured and are shown in the table below. Both powders have been screened so that all particles are less than about 75 microns.

| Sample | Surface Energy (mJ/m$^2$) | | Interfacial tension between the coating and the kibble (dynes/cm) |
|---|---|---|---|
| | Non-Polar | Polar | |
| Powder A | 33.88 | 8.127 | 5.4 |
| Powder B | 34.63 | 1.443 | 0.7 |

About 5000 grams of uncoated kibbles that have been pre-sieved to remove any fines or powders are added to a 20-liter Forberg® fluidizing mixer. The mixer is turned on, the paddles are rotated at about 87 RPM, and the Froude number is about 1. About 5 grams of Powder A are added to the top of the mixer over the fluidized zone over a period of about 30 seconds. The product is removed from the mixer, and collected in a plastic bag. The product is then analyzed for Probiotic activity.

About 5000 grams of uncoated kibbles that have been pre-sieved to remove any fines or powders are added to a 20-liter Forberg® fluidizing mixer. The mixer is turned on, the paddles are rotated at about 87 RPM, and the Froude number is about 1. About 5 grams of Powder B are added to the top of the mixer over the fluidized zone over a period of about 30 seconds. The product is removed from the mixer, and collected in a plastic bag. The product is then analyzed for Probiotic activity.

The results of these analyses are shown in the table below. The last column represents the percent log retention of the Probiotic, meaning the log of the Probiotic activity of the coated kibble dividing by the log of the Probiotic activity of the powder added to the mixer (before addition to the kibble).

| Material | Interfacial tension between the coating and the kibble (dynes/cm) | Total Probiotic activity of the powder added to the mixer (CFU/gram) | Total probiotic activity of the coated kibble (CFU/gram) | % log retention Probiotic added to the mixer that adhered to the kibbles |
|---|---|---|---|---|
| Powder A | 5.4 | 6.49E+08 | 2.23E+07 | 83.4% |
| Powder B | 0.7 | 2.13E+08 | 1.16E+08 | 96.8% |

This example shows that lowering surface energy of the powder will result in better adherance of the powder to the kibble.

Example 11

This example shows how reducing the surface energy using an emulsifier can result in better adhesion of the coating to the surface of the kibble. About 30 kg of uncoated kibbles are pre-sieved to remove any fines or powders. A 20-liter Forberg® fluidizing mixer is equipped with an air-actuated spray nozzle, a peristaltic pump to feed the nozzle, and a large container of hot chicken fat. For each experiment about 7300 g of unenrobed kibble and 990 g protein (chicken meal) coating powder are weighed out. The protein coating powder has an average particle size of about 140 microns. These dry ingredients are added to the mixer. The pump rate is set so that 330 g of fat will be sprayed in over 60 seconds. The mixer is started, the paddles are rotated at about 87 RPM, and the Froude number is about 1. After about 10 seconds, the pump is turned on and the required amount of fat is sprayed into the mixer over the kibbles for about 60 seconds. The product is removed from the mixer and sieved to separate the kibbles from the coating that did not adhere to the surface of the kibbles. Three experiments were conducted. The first experiment used the fat as a binder for the protein powder. The second experiment was the same as the first except that about 8 grams of Polysorbate 80 was added to the fat prior to spraying it on the kibbles. The third experiment was the same as the first except that about 12 grams of Polysorbate 80 was added to the fat prior to spraying it on the kibbles. The results of the experiments are shown in the table below. These results show that a small amount of Polysorbate 80 added to the chicken fat reduces the amount of protein coating that does not adhere to the kibbles.

| | Grams of PS 80 added to the fat | % PS 80 in fat | Grams of coating that did not stick to the kibbles | Percent of coating that did not stick to the kibbles |
|---|---|---|---|---|
| Exp 1 | 0 | 0.0% | 47.24 | 4.8% |
| Exp 2 | 8 | 2.4% | 27.05 | 2.7% |
| Exp 3 | 12 | 3.6% | 18.22 | 1.8% |

Decreasing Palatant Levels

The process above can be followed for the making of a pet food. In one embodiment, a core pellet as described herein can be provided along with at least one coating material, also as described herein. The coating material can be coated onto the core pellet to form a coated kibble. Such coating can be performed by way of a continuous mixing process. In such a continuous process, certain process parameters can be controlled and/or modified to apply the coating material to the core pellet. For a fluidizing mixer these process parameters include paddle length, paddle angle, number of paddles, rotation speed of the paddles, level of fill of the mixer, distance of the paddle tip from the wall and/or the bottom of the mixer, mixing time for a batch mixer, flow rate through the mixer for a continuous mixer, location of the addition points of the liquid coating, location of the addition points of the solid coating, order or sequence of the coating addition, pattern of spray of the nozzle for the liquid coating, droplet size of the liquid coating, and particle size of the solid.

Such controlling and modification of process parameters can result in changes to process measurements such as the Froude number, Peclet number, acceleration number, among others.

In another embodiment, the continuous paddle mixer (CPM) as described can be used to coat palatant onto pet food cores to produce a coated kibble. It has been found that less palatant can be used when using a CPM coating process to coat the palatant onto the pet food core, and less palatant can actually produce similar benefits as that of a coated pet food kibble having higher amounts of palatant in the coating that was coated onto the core by typical coating processes, such as APEC coating process. Typical coating processes are described in U.S. Pat. No. 7,479,294.

For example, an APEC coating process generally uses a tower section and a blender section. The tower section is in front of and above the blender section. Dry kibbles from a feeder land on a low RPM spinning disk at the top of the tower. The kibbles are spun into a 360 degree curtain that fall through the tower. Inside the curtain of falling kibbles is one or more rapidly spinning disks. The liquid or slurry, such as a coating of fat and/or palatant, to be coated on the kibbles is fed to the center of the rapidly spinning disks. The centrifugal force of the rotating spinning disk(s) sends the liquid or slurry outward from the disk toward the falling kibbles, partially coating a portion of the kibbles. The kibbles then fall into the blender section. The blender consists of a dual axle ribbon blender or a dual axle paddle blender. The axles may be co-rotating or counter rotating. Counter rotating axles may be directed so that the rotation is upward from the center and downward along the sides, or downward from the center and upward along the sides. The RPM of the axles is adjusted so that all of the kibbles remain in a packed bed in the body of the mixer. The kibbles usually are not fluidized. Coating is spread among the kibbles by kibble-to-kibble contact in the kibble bed, producing a coated kibble.

With a CPM coating process, a continuous stream of kibbles can be sent through a fluidizing mixer in a continuous process. The fluidizing mixer can be a counter-rotating dual-axis paddle mixer. The rotation of the axles can be such that the kibbles in the mixer are moved upward from the center of the mixer and downward along the sides. The RPM of the axles can be adjusted so that the kibbles in the center of mixer above the level of the axles are fluidized, i.e., moving independently upward with little or no contact with other kibbles in that section of the mixer. While the kibbles are moving upward in the air in the fluidized section, they tend to be rotating in random directions. Coatings, such as fat, palatants, liquid coating, slurry coating, solid powder coating, or some combination of these can be applied to the kibbles in the fluidized zone. Each kibble in the bed can be fluidized through the coating zone at least once during its travel through the mixer. A continuous fluidized bed mixer can be made using a dual axle paddle mixer obtained from Hayes & Stolz, Fort Worth, Tex. The angle of the paddles can be adjusted so that the Froude number is about 1 and the Peclet number is about 40.

Thus, it has been found that using a CPM to coat palatant onto a pet food core can result in using less palatant while also providing similar benefits. Thus, typical coating processes, such as the APEC coating process, apply levels of palatant that are more than the levels used by a CPM. However, as described above, the CPM coating process used to coat palatant onto pet food cores can actually deliver similar, or even better, benefits than the typical coating processes.

Thus, the present inventors have determined that by using a CPM coating process, the levels or amounts of coating components, such as palatants, can be decreased and still provide a similar benefit as if the coating component was applied at a higher level.

Without being bound by theory, it is thought that potentially four reasons exist why using less palatant by way of a CPM coating process can deliver similar benefits as a kibble coated by way of an APEC coating process. First, it is theorized that the CPM coating process improves the distribution of palatant onto the kibble core. Second, it is theorized that the CPM coating process delivers greater adherence of the palatant onto the kibble core. Third, it is theorized that the CPM coating process avoids or decreases the shearing of the palatant since the palatant is not exposed to typical mixing processes that are typically used to coat the palatant onto the core. Fourth, it is theorized that when the other coating process are used such that fat and palatant are mixed together prior to coating on the kibble core, that resulting mixture of fat and palatant entraps aromatics provided by the palatant. A CPM coating process that coats the fat onto the core following by coating of the palatant thus results in little to no entrapment of the aromatics provided by the palatant.

In one example, Eukanuba® Premium Performance was used as a kibble core and was enrobed with a coating in three different samples. The coating comprises fat and palatant. The amount of palatant was varied as follows for the three samples. One control and two test samples were produced. The coating was enrobed into the kibble core and in all samples comprised palatant as described below and poultry fat at 8.1% by weight of the coated kibble. The coating also comprised a palatant. The palatant was spray dried hydrolyzed chicken. For the control sample, the APEC process was used to enrobe the coating comprising 1%, by weight of the coated kibble, palatant onto the kibble core. For the first test sample, the CPM coating process was used to enrobe the coating comprising 0.8%, by weight of the coated kibble, palatant onto the kibble core. For the second test sample, the CPM coating process was used to enrobe the coating comprising 0.7%, by weight of the coated kibble, palatant onto the kibble core. Standard split plate tests (as described herein), two days in length with 16 dogs, were conducted to evaluate food preference. Product aroma was assessed by a human descriptive attribute panel (described as Aroma Test Human Sensory herein). Analytical oxidation values were also measured. The results of these tests are shown in Tables A through F.

Analytical oxidation values for the CPM made products were all in acceptable ranges compared to APEC control (Table A). Split plate results indicate that 0.8% palatant coated by CPM was preferred over the control (1% APEC) process with a higher amount of palatant (Tables B and C). Split plate results also indicate that 0.7% CPM coated product tended (P=0.07) to be preferred over 1% APEC coated product (Tables D and E). Human sensory results indicate few significant aroma differences between products (Table 6). However, a trend (P=0.19) existed for increasing overall meaty aroma detected in the 0.7 and 0.8% CPM products compared to the 1% APEC coated products. Given that dogs have up to 100 times more olfactory sensitivity than humans, it is plausible that subtle aroma differences detected by humans are magnified by the dog's powerful sense of smell.

TABLE A

Analytical Oxidative Stability Results

| Sample ID | Total Aldehydes | Human Oxidation Evaluation (1 = fresh, 2 = acceptable, 3 = rancid) | Oxygen Bomb (h) |
|---|---|---|---|
| 1% APEC | 25 | 1.14 | 6 |
| 0.8% CPM | 31 | 1.43 | 5 |
| 0.7% CPM | 32 | 1.43 | 4 |

TABLE B 0.8% Palatant Coated with CPM was preferred over 1.0% Palatant Coated with APEC Control Product

| WorkID Diet | Total Volume Intake Median (g) | Total Volume p-value | Percent Converted Intake Median (%) | Percent Converted p-value |
|---|---|---|---|---|
| Control: 1% APEC | 40.5 | 0.0075 | 15.0 | 0.0075 |
| Test: 0.8% CPM | 150.0 | | 85.0 | |

TABLE C 0.8% Palatant Coated with CPM Resulted in a Greater Number of First Bite Incidences than 1.0% Palatant Coated with APEC Control Product

| Date | Total Study N | Total Included in Analysis N | Control: 1% APEC | Test: 0.8% CPM |
|---|---|---|---|---|
| 1 | 15 | 15 | 3 | 12 |
| 2 | 15 | 15 | 3 | 12 |

TABLE D 0.7% Palatant Coated with CPM tended to be preferred over 1.0% Palatant Coated with APEC Control Product

| Diet | Total Volume Intake Median (g) | Total Volume p-value | Percent Converted Intake Median (%) | Percent Converted p-value |
|---|---|---|---|---|
| Control: 1% APEC | 73.5 | 0.0707 | 40.0 | 0.0707 |
| Test: 0.8% CPM | 130.5 | | 60.0 | |

TABLE E 0.7% Palatant Coated with CPM Resulted in a Greater Number of First Bite Incidences than 1.0% Palatant Coated with APEC Control Product

| Date | Total Study N | Total Included in Analysis N | Control: 1% APEC | Test: 0.7% CPM |
|---|---|---|---|---|
| 1 | 15 | 15 | 4 | 11 |
| 2 | 15 | 15 | 3 | 12 |

TABLE F

Aroma Results

| | APEC 1% | CPM 0.7% | CPM 0.8% | CPM 1% | Overall p-value |
|---|---|---|---|---|---|
| Overall Intensity | 28.1 | 27.9 | 27.1 | 28.8 | 0.9074 |
| Oily/Fatty Aroma | 18.9 | 19.4 | 19.2 | 19.8 | 0.5406 |
| Overall Meaty Aroma | 7.5 | 8.9 | 8.7 | 8.2 | 0.1881 |
| Chicken Aroma | 4.2 | 4.9 | 4.1 | 3.3 | 0.1944 |
| Fish Aroma | 4.7 | 5.2 | 4.6 | 4.5 | 0.9209 |
| Yeast | 5.6 | 6.2 | 5.6 | 5.9 | 0.6099 |
| Toast | 8.5 | 7.3 | 8.2 | 8.0 | 0.8643 |
| Sweet | 12.6 | 12.9 | 13.1 | 10.8 | 0.3668 |
| Dirty Socks | 4.1 | 3.8 | 4.3 | 4.5 | 0.4836 |
| Cardboard | 5.0 | 5.2 | 5.1 | 6.1 | 0.3027 |
| Earthy | 8.8 | 8.5 | 9.4 | 9.4 | 0.8456 |
| Grainy | 22.9 | 22.1 | 21.8 | 22.0 | 0.6513 |

TABLE F-continued

Aroma Results

| | APEC 1% | CPM 0.7% | CPM 0.8% | CPM 1% | Overall p-value |
|---|---|---|---|---|---|
| Beefy | 4.8 | 5.1 | 4.4 | 4.7 | 0.8421 |
| Sour | 4.5 | 4.5 | 4.7 | 4.9 | 0.9216 |
| Rancid | 3.9 | 4.1 | 5.5 | 4.3 | 0.0752 |

Thus, as the results in the tables show, a trend in overall meaty aroma and an increase in split plate preference exist even though less palatant was used in the CPM coated test samples when compared with the APEC coated control sample.

Thus, in one embodiment, a CPM coating process is disclosed for producing a pet food in the form of a coated kibble. Another embodiment relates to a pet food in the form of a coated kibble, wherein the coated kibble comprises a core and at least one coating. The core can be any core as described herein. The coating can be any coating as described herein. Additionally, the coating can include a palatant, as described herein, which can be applied using a continuous paddle mixer (CPM). In one embodiment, application of the palatant by way of the CPM can result coated kibbles providing similar benefits to those of palatant coated kibbles having more palatant applied. In one embodiment, the palatant can be coated using a CPM at about 0.8%, by weight of the kibble, and have similar or better preference and aroma properties of a 1.0%, by weight of the kibble, non-CPM coated kibble, such as an APEC coated kibble. Palatant coatings can be applied using the CPM coating process at any level as disclosed herein. However, it is theorized that a coating of palatant using the CPM coating process will have the beneficial affects similar to a much higher coating of palatant that is applied by a non-CPM coating process, such as an APEC coating process. It is additionally theorized that the CPM coating process improves the distribution of palatant onto the kibble core, delivers greater adherence of the palatant onto the kibble core, and allows for a decrease or complete avoidance of shearing of the core matrix and the palatant that typically occurs with coating processes since the palatant and core are not exposed to the APEC coating process when the CPM is used to coat the palatant.

The palatant used herein can be a moist, or liquid, palatant or a dry palatant. Generally, moist palatants can have a moisture content of about 12% or greater, and dry palatants can have a moisture content of less than about 12%. In other embodiments, the palatant can be a combination of moist and dry palatants. In other embodiments, the moist and dry palatants can be added in any order or can be mixed together. For example, a wet palatant can be applied first followed by the dry palatant. In another embodiment, the dry palatant can be applied first followed by the moist palatant. Any order and combination is envisioned, and any number of palatants, either moist or dry, can be used.

As described herein, with the CPM coating process, the core kibble can be coated with a coating. The coating can comprise a fat and a palatant. The coating can be a mixture of the fat and palatant, which is then coated onto the core kibble. The coating can be comprised of separate additions of fat and palatant to the core kibble. For example, the core kibble can be first coated with a fat and then can be coated with a palatant. Thus, a two step coating can be envisioned, one step being the coating of the fat, the second step being the coating of the palatant.

In one embodiment, the coating comprising a fat and palatant can be coated using a CPM. The palatant can be present at about 0.8%, by weight of the kibble, and have similar or better than preference and aroma properties of a 1.0%, by weight of the kibble, non-CPM coated kibble, such as an APEC coated kibble. In another embodiment, the palatant can be present at about 0.7%, by weight of the kibble, and have similar or better than preference and aroma properties of a 1.0%, by weight of the kibble, non-CPM coated kibble, such as an APEC coated kibble.

Thus, in one embodiment, a process of making a pet food is disclosed. The process comprises forming a core mixture comprising a starch source, a protein source, and a fat source; extruding the core mixture to form a core pellet wherein the starch is gelatinized during extrusion; providing a fat coating and a palatant coating; applying the fat coating to the core pellet to form a fat coated core pellet; applying the palatant coating to the fat coated core pellet after applying the fat coating to form a coated kibble comprising less than 12% moisture; wherein the fat coating and the palatant coating is applied using a continuous paddle mixer process.

Methods

*Salmonella* Detection

Detecting whether *Salmonella* has been sufficiently deactivated can be performed by many methods. In one exemplary embodiment, a BAX System PCR assay is used with automated detection, and the following steps are performed.

The sample is prepared by weighing 25 grams of the sample to be tested into a sterile container. 225 ml of sterile buffered peptone water (BPW) are added to the sample. The sample is incubated at 35-37° C. for at least 16 hours. Next, a 1:50 dilution is prepared by transferring 10 µl of the sample to a cluster tube containing 500 µl of Brain Heart Infusion (BHI). The tube is incubated at 35-37° C. for three hours. Heating blocks are warmed and the sample prep order is recorded manually as well as into the BAX system Kit Lot Number. Sample IDs are entered into the BAX System's software, following instructions in user guide. The thermocycler is initiated and after the three-hour incubation period in BHI, 5 µl of the re-grown samples is transferred to cluster tubes containing 2000 of lysis reagent (150 µl into 12 ml lysis buffer). These tubes are heated 20 minutes at 37° C., then 10 minutes at 95° C. The tubes are then cooled 5 minutes in lysate cooling block assembly. 50 µl of lysate is transferred to corresponding PCR tubes and the tubes capped with flat optical caps in order to detect fluorescent signal. The entire cooling block is taken to the thermocycler/detector and the PCR tubes are loaded into the heating block (making sure the tubes are seated in the wells securely). The thermocycler amplifies DNA, generating a fluorescent signal, which is automatically analyzed to determine results.

When the thermocycler/detector is complete, the screen displays a window with a modified rack view, showing different colors in the wells, with a symbol in the center to illustrate the results. Green (−) symbolizes a negative for target organism (*Salmonella*), a red (+) symbolizes a positive for target organism (*Salmonella*), and a Yellow with a (?) symbolizes an indeterminate result. The graphs for negative results are reviewed to check for the large control peak around 75-80. The graphs for positive results are interpreted using Qualicon's basis for interpretation. If a Yellow (?) result arises, the (?) sample lysate is retested as well as a BHI sample lysate.

Split Plate Test

This protocol describes the methodology and standard operating procedure for conduction of normal canine split plate testing, including ratio percent converted intake and ratio first bite.

All diets fed must receive a "negative" result for *Salmonella* as described in the *Salmonella* method section herein. Once diets have passed microbial testing successfully, the testing can begin. Diets for split plate tests are kept in Rubbermaid® brand storage bins that are labeled with the corresponding color coded label for each diet. Split plate test food bowls are filled the day before the test begins and then stored overnight in the corresponding Rubbermaid® brand diet bin. If they cannot fit in the bin with the diet, they are placed in an additional bin that has also been properly labeled with the correct color/patterned label. Split plate tests are fed at the beginning of the day, such as at 7:00 am.

The food carts are loaded each morning with the bowls being placed in kennel chronological order. Upon entering the kennel area, the technician picks up any feces from during the night and completes a visual check of each animal. After this initial animal check of the day, feeding begins. A clipboard containing the working copy, the attribute sheet, and any other essential information, has previously been placed on the cart. First choice information is then collected. The technician opens the kennel door, bowls in hand, and encourages the dog to a neutral, or centered, position. The bowls are held in front of the dog briefly, to ensure use of olfactory sense, and then placed in the bowl rings. The door is closed quietly, and the technician steps back and waits until the animal makes the first choice. The choice is noted with a circle on the sheet, and the technician progresses through the kennel, repeating the above actions for every panel member.

The bowls remain with the animals for one hour, or until either one bowl is completely consumed, or 50% of each bowl is consumed. The bowls are collected, returned to the kitchen, and weighed. The amount remaining, or "ORTs", is recorded in the correct diet column by each individual panel members' name. After being weighed, the bowls are placed in the washer rack and mechanically processed to ensure effective sanitation.

Any aberrant behavior is recorded. Any out of the ordinary events such as renovations, special collections, healthcare surveillance blood-draws, etc., are also recorded there. Any of these are immediately brought to the attention of the viewer. If any animals are ill, exhibit loose stools, vomiting, or need intercession, notification is done.

Generally, diet one is the test diet; diet two is the control diet. ORTs, as mentioned above, means the amount of food left after the feeding is completed.

Typical split plate data that is recorded can include ratio percent converted intake and ratio first bite. As used herein, ratio percent converted intake is the ratio of the food consumed of diet one versus diet two. For example, if dogs are fed diet one and diet two, and 60 grams of diet one is consumed while 40 grams of diet two is consumed, the ratio percent converted intake would be 60 g:40 g, or 1.5:1. As used herein, the ratio first bite is the ratio of the first food that an animal takes a bite of. For example, if ten dogs are presented with diet one and diet two, and seven dogs take a first bite of diet one, and three dogs take a first bite of diet two, then the ratio first bite is 7:3, or 2.33:1.

Aroma Test Human Sensory

This protocol describes the methodology for sensory evaluation to be used by sensory scientists. The method employs the human nose of panelists (human instruments) to evaluate aroma. First, an Odor Sensory Acuity test is administered to potential panelists for qualification as a panelist. The Odor Sensory Acuity test comprises two parts. The first part is odor identification. Ten samples are provided to a potential panelist. The potential panelist sniffs the samples and then identifies each aroma of the samples from a list of aromas given to him/her. The second part is the same/different test. Ten pairs of samples are presented to the potential panelist. The potential panelist sniffs each pair of samples and determines if they are the same aroma or a different aroma. Different aromas can include different by character, for example, caramel versus cherry, and different by intensity, for example, low peppermint concentration versus high peppermint concentration. A panelist is deemed a qualified panelist if they achieve 75% or greater in correct identifications of the two parts of this Odor Sensory Acuity test, cumulative.

The qualified panelists based on the Odor Sensory Acuity test are then utilized for descriptive analysis of diet aroma, using ingredients, reference standards, and finished product samples. Panelists rate products for various attributes using a 0 to 8 point scale, as follows.

Samples are prepared by placing 90-100 grams of each test product (coated kibbles) in glass jars with Teflon lids for sample evaluations. Panelists then sample one sample at a time and evaluate all samples in a set. Evaluation by the panelist comprises the following:

1) Panelist unscrews the lid from its jar;

2) Panelist takes three deep quick sniffs and then removes the sample from the nose.

3) Panelist makes assessment using a 0 to 8 point scale and records assessment.

4) Panelist breathes clean air for at least 20 seconds between samples.

Assessments by the panelists are performed according to the following sensory attribute aroma definitions. Additionally, the following aroma references are given to aid the panelist in assessing the sample on the 0 to 8 point scale.

Sensory Attribute Aroma Definitions:

Oily/Fatty: Intensity of oily; includes greasy, cooking oil, peanut oil, olive oil and fatty (poultry fat).

Chicken: Intensity of chicken aroma: includes chicken by-product meal, chicken soup, roasted chicken.

Fish: Intensity of fish aroma; includes fish meal, wet cat food (ocean fish and tuna), fish oil.

Yeast: Intensity of yeast aroma-more specifically brewer's yeast.

Toasted: Intensity of toasted aroma; includes roasted nuts or coffee and nutty, lightly toasted to more toasted.

Sweet: Intensity of sweet aroma; includes candy, caramel-like, toffee like, butterscotch, "sugar babies", floral.

Dirty Socks: Intensity of Dirty socks smell-includes musty.

Cardboard: Intensity of cardboard or corrugated paper.

Earthy: Intensity of earth/fresh dirt like aroma.

Grainy: Intensity of grain like, oats, cereal smell or corn.

Beefy: Intensity of beef smell-includes IAMS® brand wet, savory sauce beef, and IAMS® brand dog chunks (beef).

Overall Intensity: Intensity of overall aroma of any kind, ranging from mild, faint, light or weak, to strong, heavy, or pungent.

Aroma References:

| Oily/Fatty | Chicken |
|---|---|
| Vegetable Oil—1 | Diluted chicken broth—2.5 |
| Olive Oil—7 | Chicken Broth—4 |
|  | Chicken Stock—6 |

| Meaty | Fish |
|---|---|
| IAMS ® Ground Dog Beef/Rice—1 | IAMS ® Original Chicken—1 |
| IAMS ® Beef Stew—4 | IAMS ® Original Fish—2 |
|  | Tuna—8 |

| Yeast | Toasted |
|---|---|
| Dry yeast—1 | Toast—1 |
| Wet yeast—8 | Espresso ground coffee—6 |
|  | Burnt toast—7 |

| Sweet | Dirty Socks |
|---|---|
| Karo ® syrup—2 | Musty Rag—7 |
| Sugar Babies—7.5 |  |

| Cardboard | Earthy |
|---|---|
| Paper from dog/cat food bag—1 | Dirt—7 |
| Corrugated cardboard—2 |  |
| Wet corrugated cardboard—6 |  |

| Grainy aroma | Beefy |
|---|---|
| IAMS ® ground Savory Dinner w/meaty beef and rice—1 | Diluted beef broth—1 |
| IAMS ® Original chicken—3 | Dried beef—2 |
|  | Beef broth—7 |
|  | Roast beef—7-8 |

| Overall Intensity |
|---|
| Pedigree ® Chunks (wet)—2 |
| Purina ® Mighty Dog ® (wet)—3 |
| Beneful ® Original Dry—7 |

Aroma Analysis

This method uses Solid Phase MicroExtraction Gas Chromatography/Mass Spectrometry (SPME-GC-MS) to analyze pet food samples for compounds associated with aroma of the pet food. The following procedure was used to analyze the headspace volatiles above a pet food sample. The kibble product was weighed to 2.0 g (+/−0.05 g) into a SPME headspace vial (22 mL with septum cap) and the vial capped. Duplicates of each sample to be analyzed were prepared. The samples were placed into an autosampler tray of a Gerstel MPS 2 autosampler (Gerstel, Inc. Linthicom, Md., USA). The samples are heated to 75° C. for 10 minutes (equilibration time) and then sampled with a 2 cm Carb/DVB/PDMS SPME fiber (Supelco, Bellefonte, Pa., USA) at 75° C. for 10 min. The SPME fiber is then desorbed into the GC inlet (250° C.) of an Agilent 6890GC-5973 MS for 8 min. The GC is equipped with a Restek Stabilwax column 30 m×0.25 mm×0.25 m film. The GC temperature is initially 50° C. and held at this temperature for 1 minute, then ramped at 15° C./min to 240° C. and held for 4 minutes. The chromatogram is measured against standard retention times/target ions using Chemstation software, with the peaks corresponding to specific compounds collected using extracted ion chromatograms (EIC). The area under the curve was then measured to give a SPME analysis number or count.

A statistical pair-wise correlation was made between the aromatic compounds and two outcome variables from the preference test (Ratio Percent Converted Intake and First Bite). Then the headspace aromatic compounds of Iams® Mini-Chunks, and the first prototype and second prototype of Example 3 were compared. Those aromatic compounds that were 1) significantly correlated with preference and 2) elevated compared to Mini-Chunks were identified as most likely responsible for improved dog preference.

Vitamin Amounts

The following supplies are used:

| Supplies | Part Number | Vendor |
| --- | --- | --- |
| Retinol | 95144 | Fluka |
| Reagent Alcohol | 9401-02 | VWR |
| Potassium Hydroxide (45%) | 3143-01 | VWR |
| Ethoxyquin | IC15796380 | VWR |
| α-Tocopherol | 95240 | Fluka |
| Glacial Acetic Acid | 9511-02*BC | VWR |
| 4.6 × 100 mm Onyx | OOF-4097-EO | Phenomenex |
| L-Ascorbic Acid | A-7506 | Sigma |
| Acetonitrile, Optima grade | A996-4 | Fisher Scientific |
| BHT, ≥99.0% | B 1378-100G | Sigma-Aldrich |

Using top-loading balance, weigh 70.0×g (where X is any number) of the sample into a 250 ml glass jar with a screw-on lid with Teflon® lining. Add 140.0×g of deionized water, screw the lid onto the container, and mix the content well. Place container into a water bath for 2 hours at 50° C. Remove container from the water bath.

Using Retsch Grindomix GM 200 Knife Mill, pulverize the content of the glass jar in two steps of 25 seconds at 10000 rpm. Collect 100-150 g into a plastic sample cup for further analysis.

Using analytical balance, weigh between 3 and 3.3 g of the resulted mix into a 20 ml amber vial recording the weight to nearest 4 decimal places. Add 0.25-0.3 g ascorbic acid. Place magnetic bar inside the vial. Add 10 ml of reagent alcohol, and then 5 ml of 45% w/w potassium hydroxide solution. Cap the vial and vortex the content. Record the weight of the vial and place it on the hot block with magnetic stirrer. Keep the sample on the hot block for 1 hour at 110° C. Remove the vial and place it in a refrigerator to cool to or below room temperature. Record the weight of the vial after saponification. Difference between initial and final weights should be within 2% or sample must be redigested.

Place autosampler vials into a rack, and add 0.5 mL of 60:40 Reagent Alcohol:Acetic Acid with ~100 ppm of Ethoxyquin. Place into the freezer for at least 30 minutes. In the hood, uncap the vials, remove 0.5 mL of the saponificated sample, and place it into the chilled autosampler vials. Cap autosampler vials and shake vigorously. Place onto HPLC, which will give concentration of vitamin in extract, µg/mL. The Vitamin A peak should be found at close to 5 minutes, and the Vitamin E peak should be found at close to 12 minutes.

Create standards as follows:

Retinol stock standard: Into a 250 mL actinic volumetric flask, weigh about 200 mg BHT and 100 mg of Retinol, record value to 4 places. Dilute to the line in methanol and mix.

α-Tocopherol stock standard: Into a 250 mL actinic volumetric flask, weigh about 200 mg BHT and 100 mg of α-Tocopherol, record value to 4 places. Add about 200 mL of methanol, and shake, making sure all the tocopherol has dissolved. Dilute to the line and mix.

Calculate the concentration of each standard in µg/mL, and place in refrigerator. When protected from light, these stock solutions can be kept for 2 months.

Standard 1: Into a 10 mL volumetric, add 100 µL of retinol stock standard and 1 mL of α-tocopherol stock standard. Dilute to the line with methanol.

Standard 2: Into a 10 mL volumetric, add 1 mL of the Standard 1. Dilute to the line with methanol and mix.

Standard 3: Into a 10 mL volumetric, add 1 mL of the Standard 2. Dilute to the line with methanol and mix.

Run a calibration curve for new column or more frequently if needed. Run a control sample at least once daily at the beginning of the batch.

HPLC Conditions: Column Heater: 30° C.; Injection Volume: 50 µL

Solvent Gradient:

| Time | % Water | % Acetonitrile | Flow (ml/min) | Max. Press. |
| --- | --- | --- | --- | --- |
| 0 | 35 | 65 | 0.5 | 200 |
| 0.01 | 35 | 65 | 2.5 | 200 |
| 7 | 30 | 70 | 2.5 | 200 |
| 9 | 0 | 100 | 2.5 | 200 |
| 13 | 0 | 100 | 2.5 | 200 |
| 14 | 35 | 65 | 2.5 | 200 |
| 14.01 | 35 | 65 | 0.5 | 200 |

Column: 4.6 × 100 mm Onyx Monolithic C18.
Guard column: 4.6 × 5 mm Onyx Monolithic C18.
Detection: UV/Vis Diode Array or equivalent, at 324 nm and 290 nm.
Retention: The Vitamin A peak should be found at close to 5 minutes, and the Vitamin E peak should be found at close to 12 minutes.

Calibration and HPLC Operation. Calibration should be done for each new column with fresh standards. Validity of a calibration curve is checked with control samples.

Vitamins results are reported in units of IU/kg as follows:

$$\text{Vitamin A} = \frac{C * V * DF * 100}{W * 0.3};$$

$$\text{Vitamin E} = \frac{C * V * DF * 1.1}{W};$$

where
C—concentration of vitamin in extract, µg/mL (from the HPLC)
V—total volume of extraction solvents (reagent alcohol and potassium hydroxide), mL DF—dilution factor (compensates addition of neutralization solution)
W—sample aliquot weight, g The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a coated pet food in a continuous fluidizing mixer comprising:
    providing core pellets to a continuous fluidizing mixer that is a counter-rotating dual axis paddle mixer;
    wherein the mixer comprises a first end and an exit end, a horizontal length between the first end and the exit end and two counter-rotating axes, wherein each of the counter-rotating axes comprise paddles orientated at an angle relative to the axes and the core pellets are provided to the first end of the mixer;
    wherein the paddles are at an angle such that the paddles both fluidize the core pellets in a fluidized zone and maintain a forward flow of the core pellets along the horizontal length from the first end to the exit end of the mixer;
    coating the core pellets with a first liquid coating material in the mixer to form the coated core pellet;
    wherein the coating of the core pellets with the first liquid coating material is conducted to a Froude number range from about 0.8 to about 1.2 and a Peclet number greater than about 6,
    wherein the core pellets have a residence time in the mixer from about 30 seconds to about 180 seconds; and
    discharging the coated pet food from the exit end of the mixer.

2. The process of claim 1, further comprising coating the coated core pellet with a second coating material comprising a liquid or a powder.

3. The process of claim 1, wherein the continuous fluidizing mixer is operated such that the core pellets have a flow through the continuous fluidizing mixer of between about 1,000 kg/hr and about 40,000 kg/hr.

4. The process of claim 1, wherein the Peclet number is between about 6 and about 40.

5. The process of claim 1, wherein the Peclet number is between about 40 and about 100.

6. The process of claim 1, wherein the step of coating the core pellets with the first liquid coating material to form a coated core pellet comprises spraying a liquid binder onto the core pellets in the fluidized zone at least one location along the horizontal length of the mixer.

7. A process for coating a pet food in a continuous fluidizing mixer comprising:
    providing a continuous flow of uncoated core pellets to a continuous fluidizing mixer, the mixer comprising at least two counter-rotating paddles mounted at an angle on separate axes; and
    coating the core pellets by introducing at least a first liquid coating material to the mixer while counter-rotating the at least two paddles;
    wherein the angle of the paddles on the axes fluidizes the core pellets and causes the core pellets to move continuously, and with substantially plug flow, through and out of the mixer to provide the coated pet food.

8. The process of claim 7, wherein the flow of core pellets to the mixer and the flow of coated core pellets out of the mixer are mass balanced and steady state.

9. The process of claim 8, wherein the amount of core pellets within the mixer remains approximately constant during the process.

10. The process of claim 7, wherein the mixer is operated so that the Peclet number is greater than about 6.

11. The process of claim 7, further comprising introducing a second coating material to the mixer.

12. The process of claim 7, wherein the core pellets flow through the continuous fluidizing mixer at a flow rate of between about 1,000 kg/hr and about 40,000 kg/hr.

13. The process of claim 10, wherein the Peclet number is between about 6 and about 40.

* * * * *